United States Patent [19]
Horiuchi et al.

[11] Patent Number: 5,936,742
[45] Date of Patent: Aug. 10, 1999

[54] METHOD AND APPARATUS FOR PROCESSING IMAGE

[75] Inventors: Masanobu Horiuchi, Yokohama; Yoshinori Takagishi, Tokyo; Naohiko Takemoto, Kawasaki, all of Japan

[73] Assignee: Canon Kabushiki Kaisha, Tokyo, Japan

[21] Appl. No.: 08/841,640

[22] Filed: Apr. 30, 1997

Related U.S. Application Data

[62] Division of application No. 08/395,587, Feb. 28, 1995, abandoned, which is a division of application No. 07/861,632, Apr. 1, 1992, Pat. No. 5,420,693.

[30] Foreign Application Priority Data

Apr. 1, 1991 [JP] Japan .................................. 3-068576
Apr. 1, 1991 [JP] Japan .................................. 3-068578

[51] Int. Cl.$^6$ ............................................. H04N 1/00
[52] U.S. Cl. ....................... 358/400; 358/434; 358/468
[58] Field of Search ...................................... 358/400, 401, 358/434, 440, 442, 468, 402, 407, 403; H04N 1/00

[56] References Cited

U.S. PATENT DOCUMENTS

| | | | |
|---|---|---|---|
| 4,366,509 | 12/1982 | Norrell et al. ............................ | 358/426 |
| 4,772,956 | 9/1988 | Roche et al. ............................. | 358/433 |
| 4,811,111 | 3/1989 | Kurokawa ................................ | 358/440 |
| 4,999,715 | 3/1991 | Porcellio et al. ........................ | 358/426 |
| 5,018,082 | 5/1991 | Obata et al. ............................. | 395/337 |
| 5,072,309 | 12/1991 | Brown ..................................... | 358/434 |
| 5,130,805 | 7/1992 | Rikima .................................... | 358/404 |
| 5,159,443 | 10/1992 | Ando ....................................... | 358/500 |
| 5,239,576 | 8/1993 | Yoshida et al. .......................... | 379/355 |
| 5,268,770 | 12/1993 | Yukino .................................... | 358/435 |
| 5,293,256 | 3/1994 | Fukushima et al. ..................... | 358/468 |
| 5,341,223 | 8/1994 | Shigeeda et al. ........................ | 358/440 |
| 5,351,133 | 9/1994 | Blonstein ................................ | 358/426 |
| 5,384,836 | 1/1995 | Otsuka .................................... | 379/100 |
| 5,420,693 | 5/1995 | Horiuchi et al. ........................ | 358/433 |
| 5,572,585 | 11/1996 | Tsutsui .................................... | 379/242 |
| 5,668,640 | 9/1997 | Nozawa et al. ......................... | 358/434 |
| 5,696,597 | 12/1997 | Miura ...................................... | 358/468 |

OTHER PUBLICATIONS

Rank Xerox, "Xerox 3010 Facsimile Terminal Operator Manual" May 1990.

*Primary Examiner*—Kim Yen Vu
*Attorney, Agent, or Firm*—Fitzpatrick, Cella, Harper & Scinto

[57] ABSTRACT

An image processing apparatus transmits image data to a communication partner by selectively using one of a first transmission mode and a second transmission mode. The apparatus has a display unit that displays first image information representing the communication partner and second image information representing a communication state. In the first transmission mode, the first image information is displayed independently from the second image information such that the second image information does not overlap the first image information and such that the first image information is not included in the second image information. In the second transmission mode, the second image information is displayed such that the first image information is included in a part of the second image information.

8 Claims, 39 Drawing Sheets

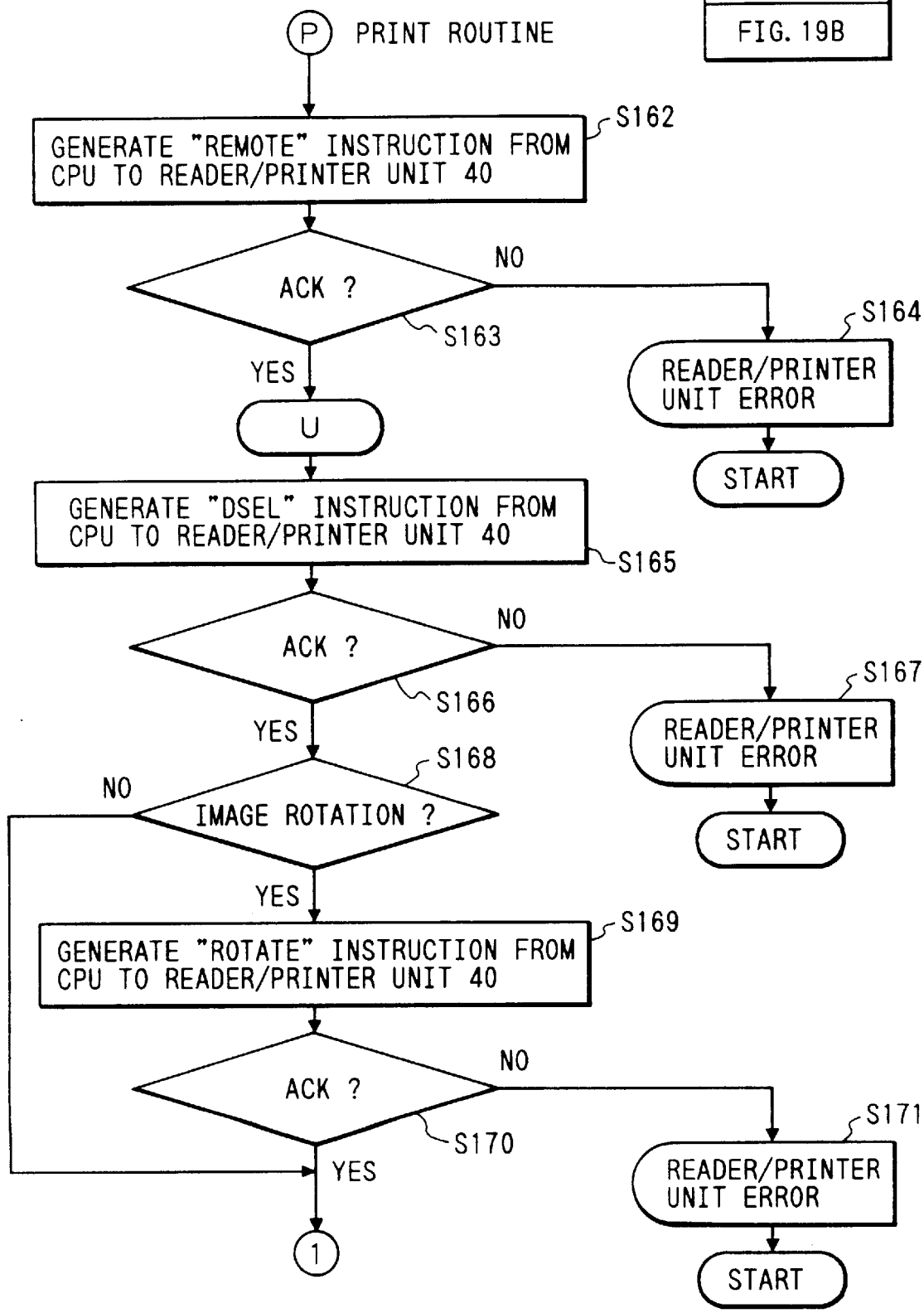

FIG. 28

COLOR IMAGE TRANSMISSION SYSTEM

```
PARTNER TELEPHONE NUMBER      [                              ]

SUB ADDRESS                   [                  ]

PARTNER NAME                  [             ]

TRANSMISSION-SIDE USER NAME   [             ]

TRANSMISSION-SIDE TELEPHONE NUMBER [                         ]

PAPER SIZE                      [3]  (1=A3 2=B4 3=A4)
RESOLUTION                      [2]  (1=100dpi 2=200dpi 3=400dpi)
AUTO REDIALING                  [1]  (1=YES 2=NO)
TRANSMISSION-SIDE INDICATION    [1]  (1=YES 2=NO)
MEMORY TRANSMISSION             [1]  (1=ON 2=OFF)
MEMORY RECEPTION                [1]  (1=ON 2=OFF)
```

F1=TRANSMISSION F2=STOP F3=REPORT F4=TELEPHONE DIRECTORY F5=TELEPHONE DIRECTORY REGISTRATION F6=FILE

MAIN MENU IMAGE PLANE

FIG. 29

COLOR IMAGE TRANSMISSION SYSTEM

| | NAME | TELEPHONE NUMBER | SUB ADDRESS |
|---|---|---|---|
| 1 | SHIMOMARUKO OFFICE | 123-5689 | 000008 |
| 2 | AMI FACTORY | 03-3668-565 | 00002 |
| 3 | YOYOGI OFFICE | 236-8995 | 000004 |
| 4 | ○○○ TECHNICAL CENTER | 4555-26566 | 000006 |
| 5 | KAMATA OFFICE | 1256-56892 | 0005 |
| 6 | ○○○ SALES NAGOYA BRANCH | 256632-55 | 000004 |
| 7 | △△△ | 32366-56566 | 002234 |
| 8 | □□□ HEAD OFFICE | 56556-98955 | 000035 |
| 9 | SENDAI OFFICE | 5656-78212 | 000001 |
| 10 | WESTERN JAPAN OFFICE | 455-5668 | 122000 |

| | |
|---|---|
| PAPER SIZE | [3] (1=A3 2=B4 3=A4) |
| RESOLUTION | [2] (1=100dpi 2=200dpi 3=400dpi) |
| AUTO REDIALING | [1] (1=YES 2=NO) |
| TRANSMISSION-SIDE INDICATION | [1] (1=YES 2=NO) |
| MEMORY TRANSMISSION | [1] (1=ON 2=OFF) |
| MEMORY RECEPTION | [1] (1=ON 2=OFF) |

TELEPHONE DIRECTORY IMAGE PLANE

F1=TRANSMISSION F2=STOP F3=REPORT F4=BROADCASTING F5=BROADCASTING RELEASE

```
*** IN RECEPTION ***
TRANSMISSION-SIDE : YOYOGI OFFICE
TELEPHONE NUMBER : 03-4568-3592
```

FIG. 31

COLOR IMAGE TRANSMISSION SYSTEM

PARTNER TELEPHONE NUMBER [ 03-3455-9327 ]

SUB AD * IN TRANSMISSION *

PARTNE

TRANSMISSION-SIDE USER NAME [

TRANSMISSION-SIDE TELEPHONE NUMBER [

PAPER SIZE [3] (1=A3 2=B4 3=A4)
RESOLUTION [2] (1=100dpi 2=200dpi 3=400dpi)
AUTO REDIALING [1] (1=YES 2=NO)
TRANSMISSION-SIDE INDICATION [1] (1=YES 2=NO)
MEMORY TRANSMISSION [1] (1=ON 2=OFF)
MEMORY RECEPTION [1] (1=ON 2=OFF)

F1=TRANSMISSION F2=STOP F3=REPORT F4=TELEPHONE DIRECTORY F5=TELEPHONE DIRECTORY REGISTRATION F6=FILE

FIG. 32

COLOR IMAGE TRANSMISSION SYSTEM

| | NAME | TELEPHONE NUMBER | SUB ADDRESS |
|---|---|---|---|
| 1 | SHIMOMARUKO OFFICE | 123-5689 | 000008 |
| 2 | | | 00002 |
| 3 | | | 000004 |
| 4 | | | 000006 |
| 5 | | | 0005 |
| 6 | | | 000004 |
| 7 | | | 002234 |
| 8 | □□□ HEAD OFFICE | 56556-98955 | 000035 |
| 9 | SENDAI OFFICE | 5656-78212 | 000001 |
| 10 | WESTERN JAPAN OFFICE | 455-5668 | 122000 |

* IN TRANSMISSION *

PARTNER : AMI FACTORY
TELEPHONE NUMBER : 03-3568-565

PAPER SIZE                          [3] (1=A3 2=B4 3=A4)
RESOLUTION                          [2] (1=100dpi 2=200dpi 3=400dpi)
AUTO REDIALING                      [1] (1=YES 2=NO)
TRANSMISSION-SIDE INDICATION        [1] (1=YES 2=NO)
MEMORY TRANSMISSION                 [1] (1=ON 2=OFF)
MEMORY RECEPTION                    [1] (1=ON 2=OFF)

F1:TRANSMISSION F2:STOP F3:REPORT F4:BROADCASTING F5:BROADCASTING RELEASE

FIG. 33

COLOR IMAGE TRANSMISSION SYSTEM

| | NAME | TELEPHONE NUMBER | SUB ADDRESS |
|---|---|---|---|
| 1 | SHIMOMARUKO OFFICE | 123-5689 | 000008 |
| 2 | AMI FACTORY | 03-3668-565 | 00002 |
| 3 | YOYOGI OFFICE | 236-8995 | 000004 |
| 4 | ○○○ TECHNICAL CENTER | 4555-26566 | 000006 |
| 5 | KAMATA OFFICE | 1256-56892 | 0005 |
| 6 | ○○○ SALES NAGOYA BRANCH | 256632-55 | 000004 |
| 7 | △△△ | 32366-56566 | 002234 |
| 8 | □□□ HEAD OFFICE | 56556-98955 | 000035 |
| 9 | SENDAI OFFICE | 5656-78212 | 000001 |
| 10 | WESTERN JAPAN OFFICE | 455-5668 | 122000 |

PAPER SIZE [3] (1=A3 2=B4 3=A4)
RESOLUTION [2] (1=100dpi 2=200dpi 3=400dpi)
AUTO REDIALING [1] (1=YES 2=NO)
TRANSMISSION-SIDE INDICATION [1] (1=YES 2=NO)
MEMORY TRANSMISSION [1] (1=ON 2=OFF)
MEMORY RECEPTION [1] (1=ON 2=OFF)

F1:TRANSMISSION F2:STOP F3:REPORT F4:BROADCASTING F5:BROADCASTING RELEASE

FIG. 34

**\*\* COMMUNICATION MANAGEMENT REPORT \*\***

| COMMUNICATION MODE | PARTNER TELEPHONE NUMBER | PARTNER NAME | TIME | RESULT |
|---|---|---|---|---|
| AUTO RECEPTION | 1232-56623 | SHIMOMARUKO OFFICE | 03/12 11:45 | OK |
| AUTO RECEPTION | 23235-566648 | AMI FACTORY | 03/12 12:01 | OK |
| TRANSMISSION | 56565665 | | 03/13 08:23 | OK |
| SUBSTITUTE RECEPTION | 689-565668 | AKASAKA OFFICE | 03/15 14:54 | OK |
| BROADCASTING TRANSMISSION | 458992-2872 | OSAKA BRANCH | 03/16 16:38 | NG |
| BROADCASTING TRANSMISSION | 5656-9820 | NAGOYA BRANCH | 03/20 07:09 | NG |
| BROADCASTING TRANSMISSION | 26-23589 | FUKUOKA BRANCH | 03/23 15:30 | OK |
| AUTO RECEPTION | 102-2363 | KANTO OFFICE | 03/26 10:34 | OK |
| TRANSMISSION | 566-56562 | HOKKAIDO BRANCH | 03/30 09:15 | NG |

F1=DELETE    F5=RETURN

FIG. 35

```
PAPER SIZE                   [3]  (1=A3 2=B4 3=A4)
RESOLUTION                   [2]  (1=100dpi 2=200dpi 3=400dpi)
AUTO REDIALING               [1]  (1=YES 2=NO)
TRANSMISSION-SIDE INDICATION [1]  (1=YES 2=NO)
MEMORY TRANSMISSION          [1]  (1=ON 2=OFF)
MEMORY RECEPTION             [1]  (1=ON 2=OFF)
```

ENVIRONMENT SET DIALOG

FIG. 36

```
A4-SIZE CASSETTE IS NOT MOUNTED ON PARTNER PRINTER.
PLEASE SELECT FOLLOWING OPTION:
        1. TRANSMISSION STOP
        2. REDUCTION TRANSMISSION
        3. MEMORY SUBSTITUTE RECEPTION (PARTNER SIDE)
              [ ]
```

FIG. 37

```
READER/PRINTER UNIT IS UNUSABLE.
DO YOU WANT MEMORY SUBSTITUTE RECEPTION ?

1. YES
       2. NO
       [ ]
```

METHOD AND APPARATUS FOR PROCESSING IMAGE

This application is a division of application Ser. No. 08/395,587 filed on Feb. 28, 1995, now abandoned, which is a divisional of application Ser. No. 07/861,632 filed on Apr. 1, 1992 now U.S. Pat. No. 5,420,693.

BACKGROUND OF THE INVENTION

1. Field of the Invention

The present invention relates to a method and apparatus for processing an image to perform data communication of input image data.

2. Related Background Art

A typical example of a conventional apparatus of this type is a facsimile apparatus. An original is read by a transmission-side apparatus, and data of the read original is encoded. The encoded data is transmitted to a reception-side apparatus. The reception-side apparatus expands the encoded data and outputs it. At this time, the read data on the transmission side is processed to reduce the quantity of data by some method (this processing is called compression hereinafter). The compressed data is transmitted and is decoded on the reception side.

In this conventional example, when data compression is used, received compressed image data is frequently expanded by means of predictive expansion.

One of such predictive techniques is pixel interpolation for interpolating data between pixels with reference to the decoded data of neighboring pixels. Since this pixel interpolation refers to the data of neighboring pixels, reference data are available at the edge of the image, and appropriate values cannot be obtained. For this reason, the edge portion of the decoded image is often deteriorated.

When the quantity of data is greatly increased upon transfer of one frame as in a color image, it may be proposed to divide an original into several blocks and transmit it block by block. When the image data is decoded in this case, the edge portions of the image data of the respective blocks are deteriorated. When the divided image data blocks transferred to the reception side are synthesized on the reception side, distortion at the boundaries of adjacent blocks cannot be perfectly restored, resulting in inconvenience.

The following series of operations is generally performed in a conventional case. After an original is read by a transmission-side apparatus, image data of the read original is encoded in accordance with various schemes. The encoded data is transferred to a reception-side apparatus. The reception-side apparatus expands the reception data and outputs the expanded data.

In the above series of operations, when arbitrary processing is designated, the next processing cannot be started until the end of the arbitrary processing to cause a wait time. In particular, when color image data is to be processed, efficient processing is desirable because the quantity of data is greatly increased.

SUMMARY OF THE INVENTION

It is an object of the present invention to prevent deterioration of image quality when an input image is divided into blocks and is encoded block by block.

It is another object of the present invention to provide a method and apparatus for processing an image so as to properly divide the image into blocks and efficiently encode image data.

In order to achieve the above objects of the present invention, there is provided an image processing apparatus comprising:

dividing means for dividing an input image into N block images;

encoding means for encoding the block images divided by the dividing means; and setting means for setting the number N before the dividing means divides the input image, wherein the dividing means divides the input image so that at least two of the block images are overlapping each other.

It is still another object of the present invention to encode color image data divided into blocks at high speed.

In order to achieve the above object of the present invention, there is provided a color image data processing system comprising input means for dividing color image data of one page into a plurality of block data and inputting the plurality of block data, compressing means for converting input data into compressed data, and means for causing the input means and the compressing means to input the input data and compress the block data functionally parallelly.

It is still another object of the present invention to appropriately decode encoded image data in accordance with the method described above.

In order to achieve the above object of the present invention, there is provided an image processing apparatus comprising:

receiving means for receiving a plurality of encoded block images, at least two of the block images being overlapping each other;

decoding means for decoding the encoded block images;

reducing means for reducing the block images decoded by the decoding means; and output means for integrating the block images reduced by the reducing means and outputting a reproduction image.

According to the present invention, there is also provided a color image data processing system comprising:

receiving means for receiving color image data of one page divided into a plurality of blocks;

expanding means for expanding the block data received by the receiving means;

output means for outputting the data expanded by the expanding means; and means for causing the expanding means and the output means to expand the block data and output the expanded data functionally parallelly.

It is still another object of the present invention to provide a communication apparatus having good operability.

The above and other objects, features, and advantages of the present invention will be apparent from the following detailed description and the appended claims in conjunction with the accompanying drawings.

BRIEF DESCRIPTION OF THE DRAWINGS

FIG. 28 is a view showing a display content of this embodiment;

FIG. 29 is a view showing another display content of this embodiment;

FIG. 31 is a view showing still another display content of this embodiment;

FIG. 32 is a view showing still another display content of this embodiment;

FIG. 33 is a view showing still another display content of this embodiment;

FIG. 34 is a view showing still another display content of this embodiment;

FIG. 35 is a view showing still another display content of this embodiment;

FIG. 36 is a view showing still another display content of this embodiment;

FIG. 37 is a view showing still another display content of this embodiment;

DETAILED DESCRIPTION OF THE PREFERRED EMBODIMENT

A preferred embodiment of the present invention will be described with reference to the accompanying drawings.

Figure 1:
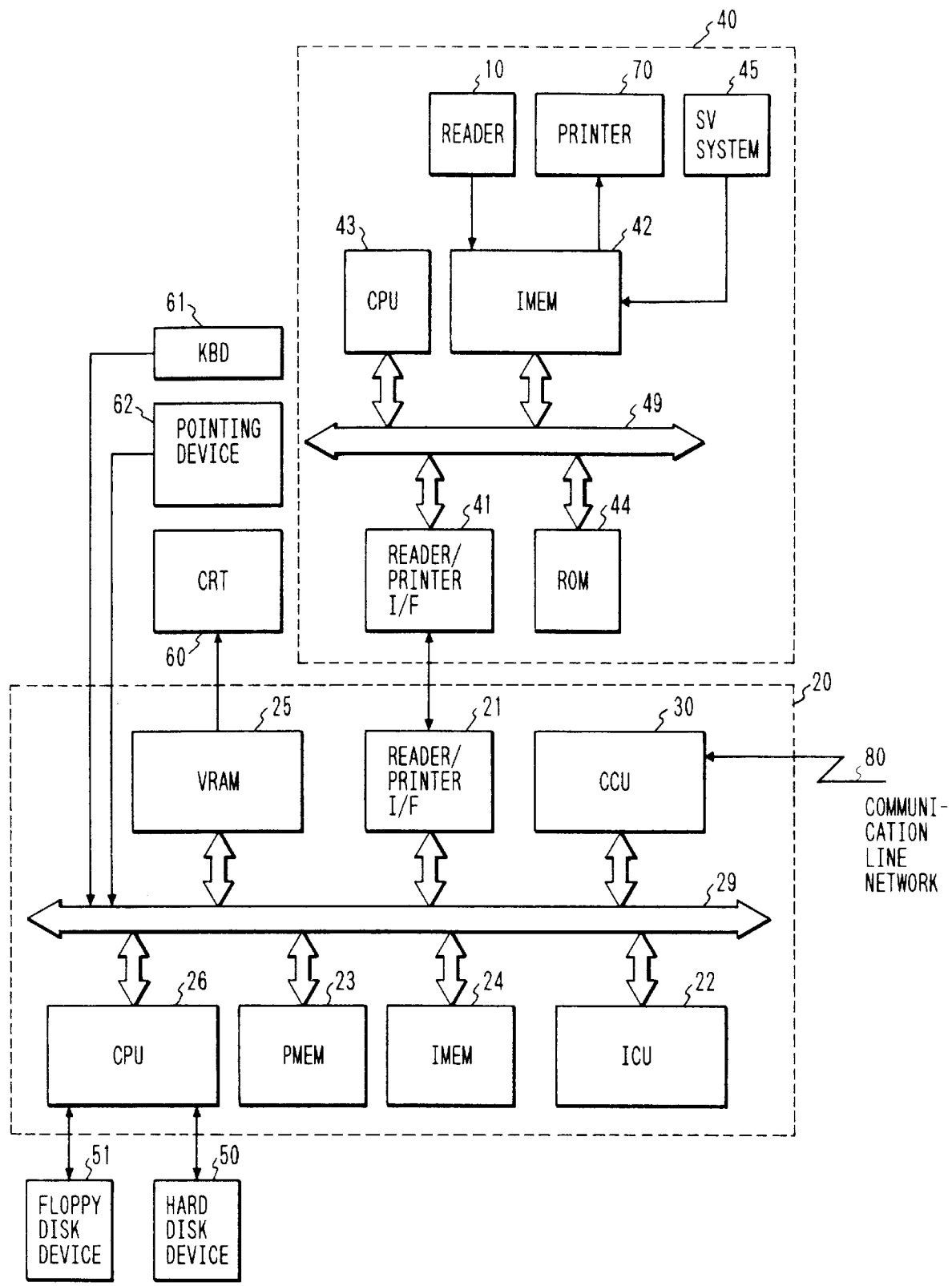
FIG. 1 is a block diagram showing an arrangement according to an embodiment of the present invention.
Figure 2:
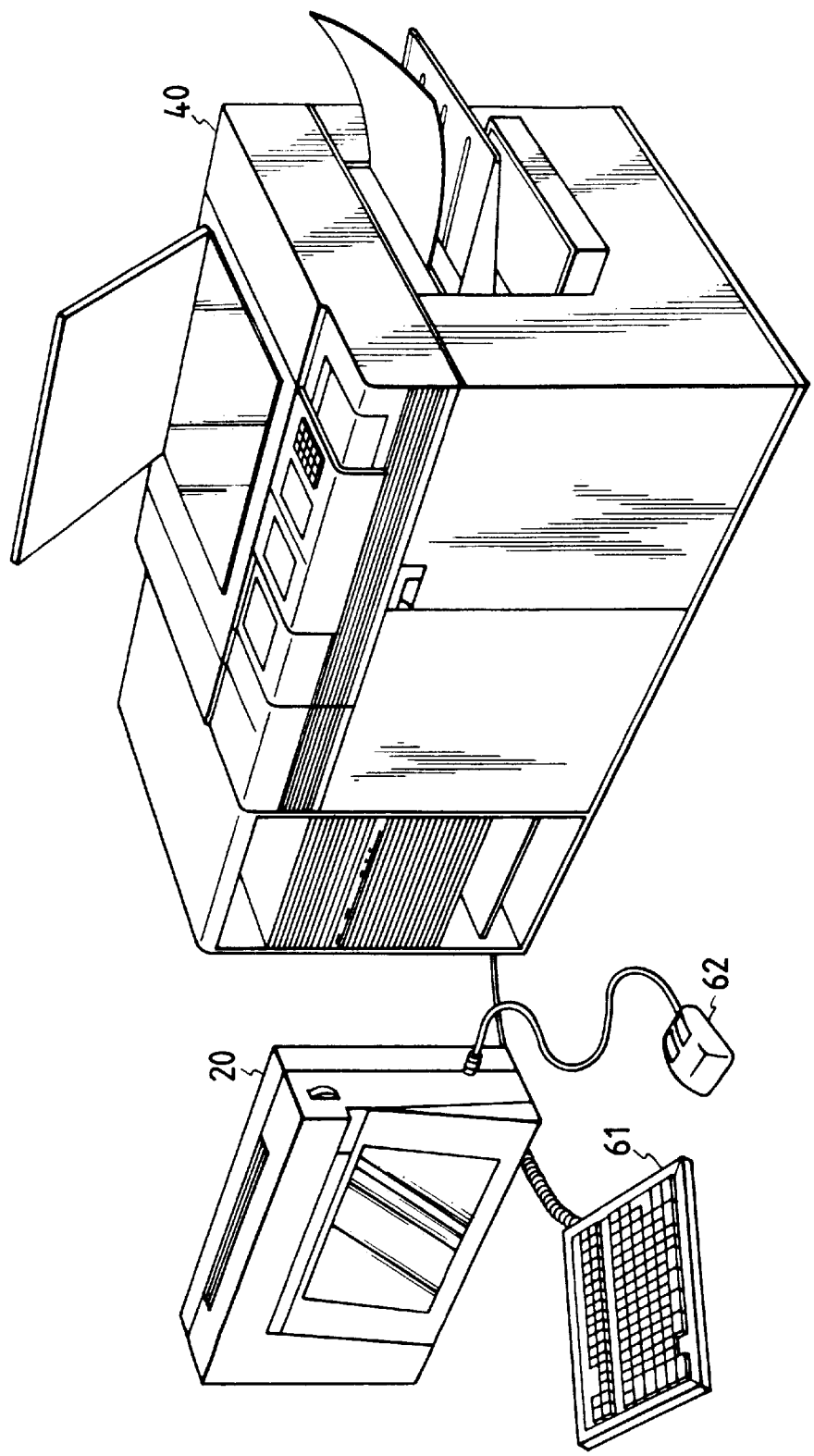
FIG. 2 is a perspective view showing an image data communication apparatus of this embodiment.

FIG. 1 is a block diagram showing an embodiment of the present invention, and FIG. 2 is a perspective view showing this embodiment.

A color image data processing system main body 20 comprises a reader/printer interface (I/F) 21, an image compression unit (to be referred to as an ICU hereinafter) 22, a program memory (to be referred to as a PMEM hereinafter) 23, an image memory (to be referred to as an IMEM hereinafter) 24, a video RAM (to be referred to as a VRAM hereinafter) 25, a central processing unit (to be referred to as a CPU hereinafter) 26, a bus 29, and a communication control unit (to be referred to as a CCU hereinafter) 30.

In this embodiment, the ICU 22 is used to compress or expand data and employs AVQ (Adaptive Vector Quantization) to improve encoding efficiency and data decodability. The PMEM 23 has an OS program area and application program memory areas to control an I/O device arranged as a peripheral device of the image data processing system main body 20 and the respective units in the image data processing system main body 20.

The PMEM 23 also includes a memory management unit (MMEU) and a work area serving as a buffer for transmitting data from a hard disk through the CCU 30 and cause the hard disk to store data from the CCU 30. This buffer is arranged to match the speeds of, e.g., a disk and a communication line. The buffer also stores sentence code data input from a keyboard (KBD) 61.

The IMEM 24 has a 2-Mbyte capacity and stores an image from a reader 10. The IMEM 24 also temporarily stores an image to be compressed or expanded by the ICU 22, and stores an image to be output to a printer 70.

The VRAM 25 stores image data to be displayed on a CRT 60 in the form of bit map codes.

A reader/printer unit 40 includes an image memory (IMEM) 42 for storing image data from the above I/O devices, a reader/printer interface (I/F) 41 for communicating with the color image data processing system main body 20, and a CPU 43 and a ROM 44 which control the IMEM 42 and the reader/printer I/F 41.

The reader 10 comprises a CCD line sensor and reads a predetermined original to output chrominance component signals of R (red), G (green), and B (blue). In addition to the above components, the color laser beam printer 70 is arranged to form an image in accordance with the processed signals.

A hard disk device 50 and a floppy disk device 51 are arranged as external memory devices, respectively. These devices are nonvolatile memories. In this case, a back-up memory can be used as a nonvolatile memory.

The keyboard 61 is used to enter a character or the like and designate a position on the CRT 60 together with a cursor. A pointing device 62 is arranged as an input device in addition to the keyboard 61.

In the embodiment having the above arrangement, the system performs data compression/expansion and data transfer functionally parallelly on the transmission and reception sides, so that high-speed data communication of the read image data can be performed.

Figure 3:
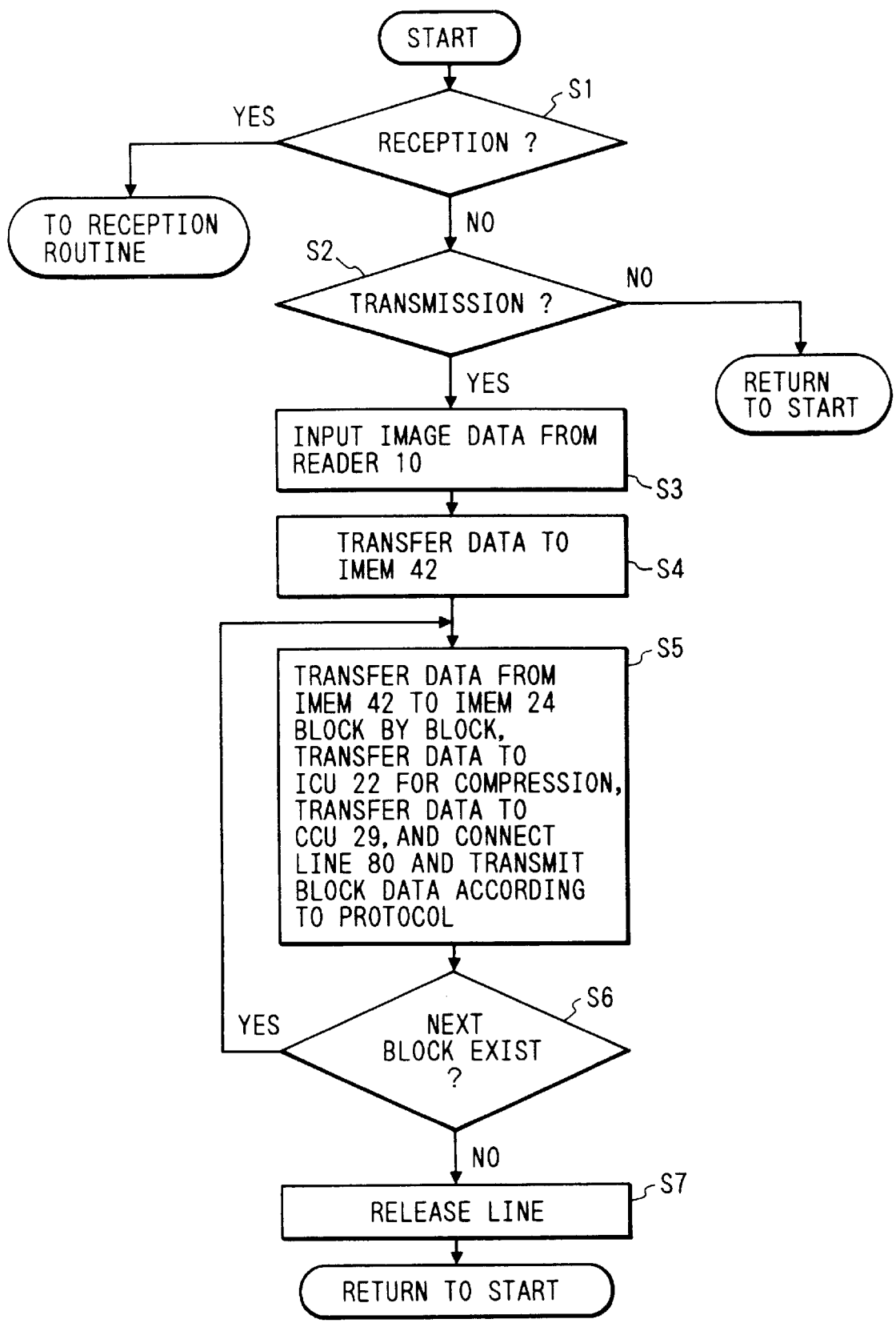
FIG. 3 is a flow chart of this embodiment.
Figure 4:
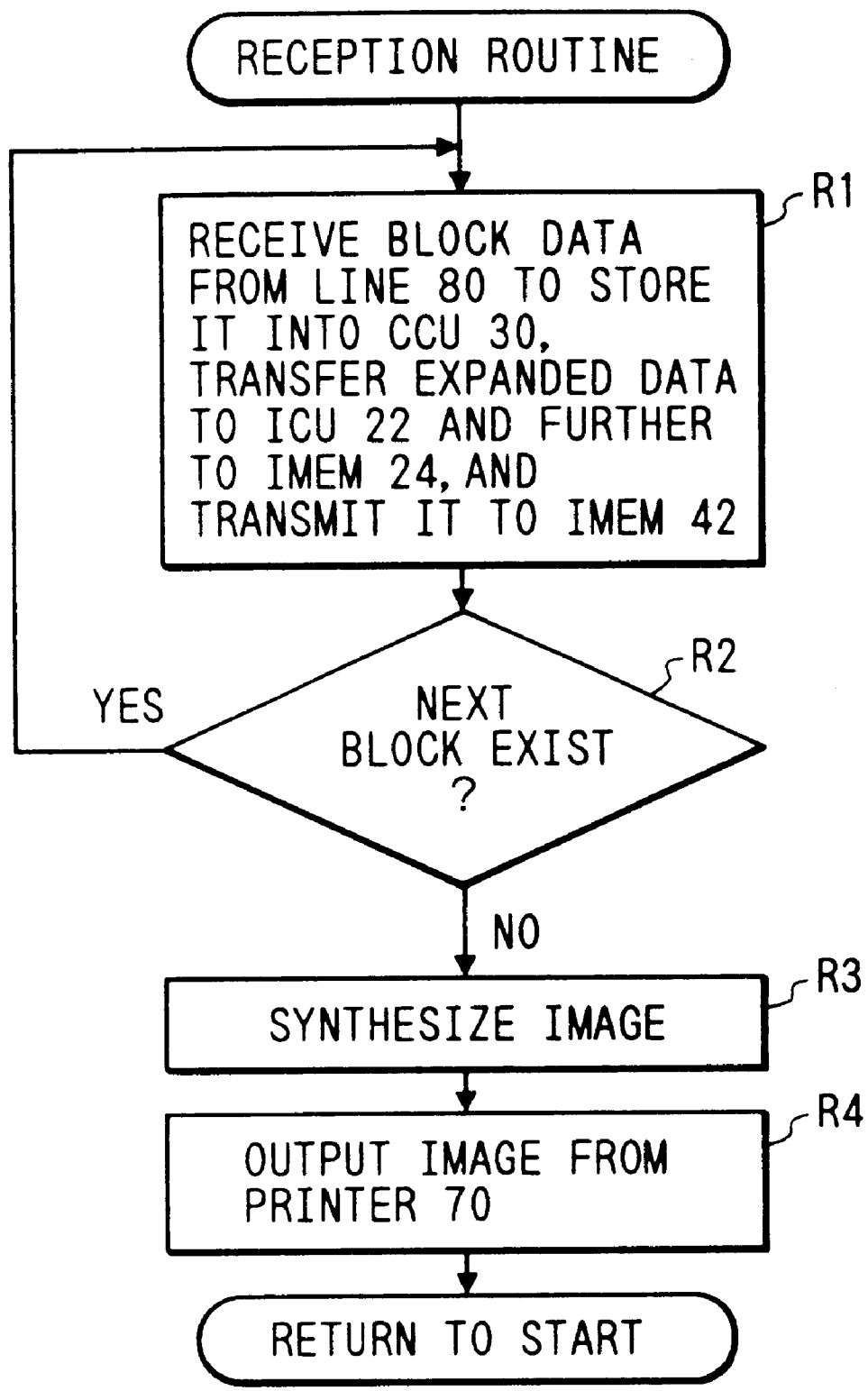
FIG. 4 is a flow chart showing a reception routine.

FIGS. 3 and 4 are flow charts showing control operations of the CPU 26 according to this embodiment.

The CPU 26 determines in step Si of FIG. 3 whether data is received or transmitted. Since the apparatus is automatically set in a data reception mode, an operator must set a data transmission mode with the keyboard 61 or the pointing device 62 if he wishes to transmit data. In data reception, the flow advances from step S1 to step R1. In data transmission, the flow advances from step S2 to step S3. In steps S3 and S4, an image to be transmitted is entirely read by the reader 10, and color image data is stored in the IMEM 42 on the printer side. In step S5, the color image data is divided into a plurality of blocks and is transmitted block by block from the IMEM 42 to the IMEM 24 on the main body side (this transfer method is called block transfer, and divided data subjected to block transfer is called block data hereinafter). The block data in the IMEM 24 is transferred to the ICU 22 for compression on the transmission side. The ICU 22 compresses and encodes the block data. This compression method may be any method in accordance with the type of image. That is, MH (modified Huffman) coding, MR (modified READ) coding, or MMR (modified modified READ) coding can be used for a binary image. The AVQ scheme described above is available for a color image. In addition to these schemes, an ADCT (Adaptive Discrete Cosine Transform) scheme to be standardized by JPEG can be used for a color image. This embodiment employs the AVQ scheme.

Figure 40:
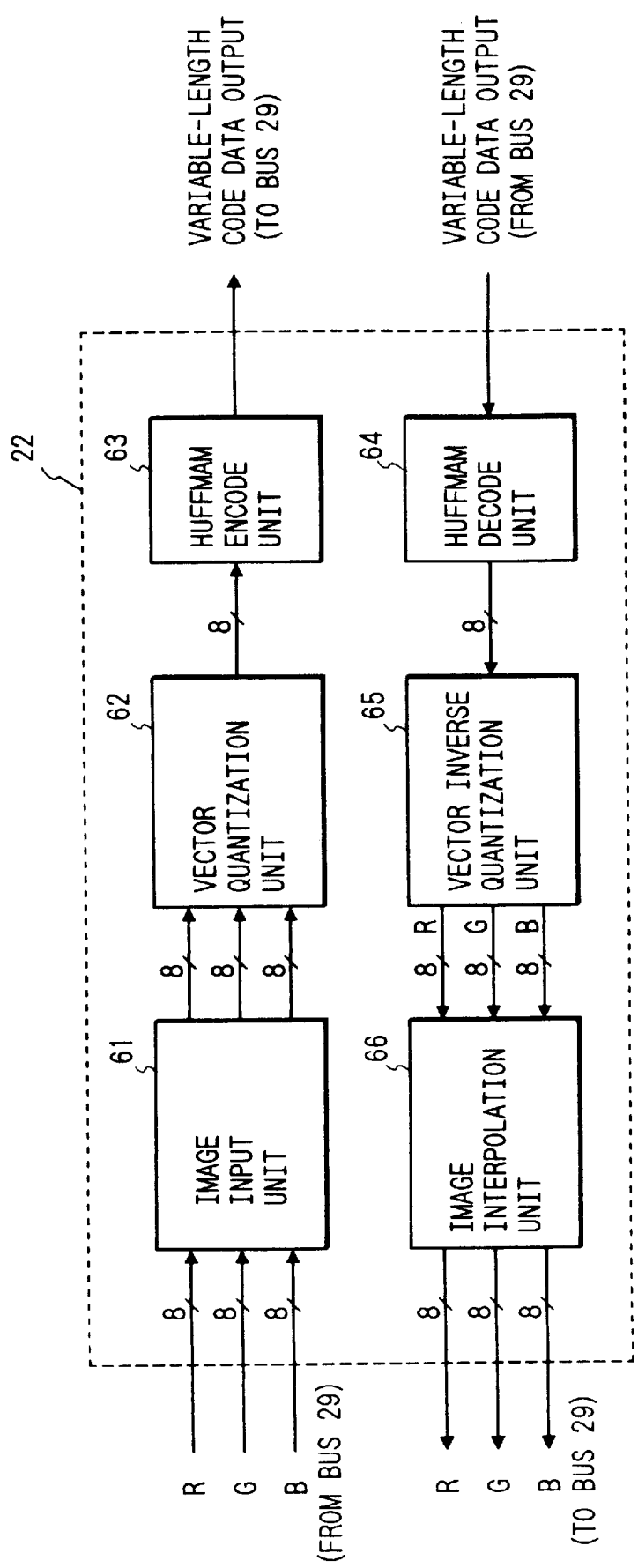
FIG. 40 is a block diagram showing a compression/expansion arrangement.

A compression/expansion scheme in the ICU 22 is shown in FIG. 40.

Referring to FIG. 40, an image input unit 61 receives 8-bit R, G, and B signals, extracts image data in units of blocks each consisting of 8 (pixels)×8 (pixels), and outputs block data. A vector quantization unit 62 quantizes image data (8 bits×3 colors) into 8-bit vector data and outputs the 8-bit vector data. A Huffman encode unit 63 encodes the 8-bit vector data output from the vector quantization unit 62 into variable-length code data in accordance with a predetermined Huffman code.

A Huffman decode unit 64 receives the encoded data and performs Huffman decoding to output 8-bit vector data. A vector inverse quantization unit 65 outputs 8-bit R, G, and B data in accordance with the 8-bit vector data. An image interpolation unit 66 interpolates pixel data using data of neighboring pixels.

In the above scheme, in color image data having a size of $\underline{n}$(pixels)×$\underline{m}$(pixels), the difference between neighboring pixels in a predetermined direction is subjected to vector quantization, thereby compressing the color image data. However, when the compressed data is expanded using pixel interpolation, two upper pixels, two lower pixels, two right pixels, and two left pixels subject to deterioration. In order to eliminate this drawback, in this embodiment, in data having a size of (n+2) (pixels)×(m+2) (pixels), the difference between neighboring pixels is compressed. The compressed data is expanded as an image having a size of $\underline{n}$×$\underline{m}$, thereby preventing image deterioration.

In the adaptive vector quantization used in this embodiment, when data having a size of $(n+n_o) \times (m+m_o)$ is to be compressed and expanded, the condition $n_o=m_o=2$ must be established. In general, an entire string T subjected to a difference method is defined as follows:

$$T = U \odot V$$

where V is a portion subjected to data deterioration caused by the difference method, U is a portion free from data deterioration, and $\odot$ represents a sum of areas.

Figure 39A:
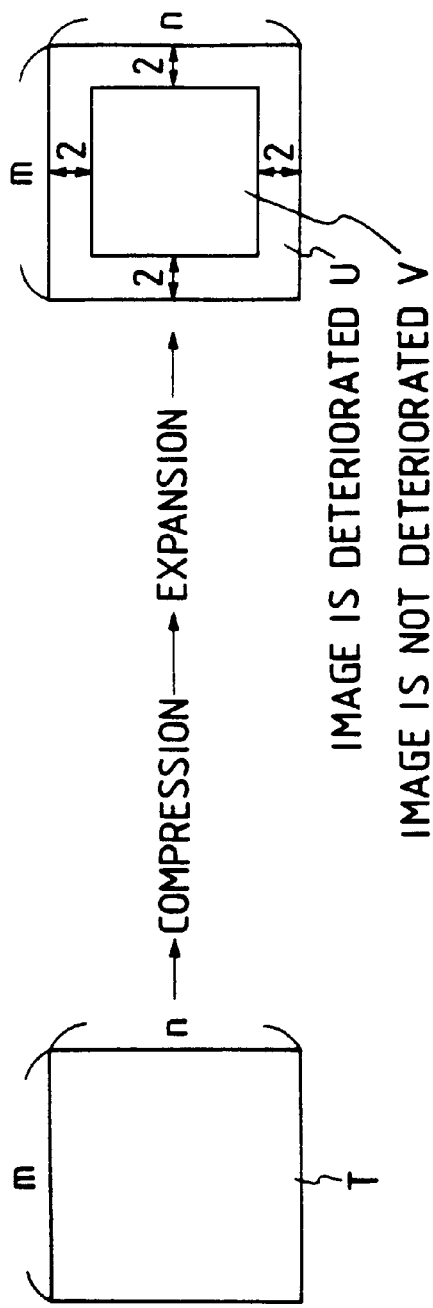
FIG. 39 is a view showing block division.
Figure 39B:
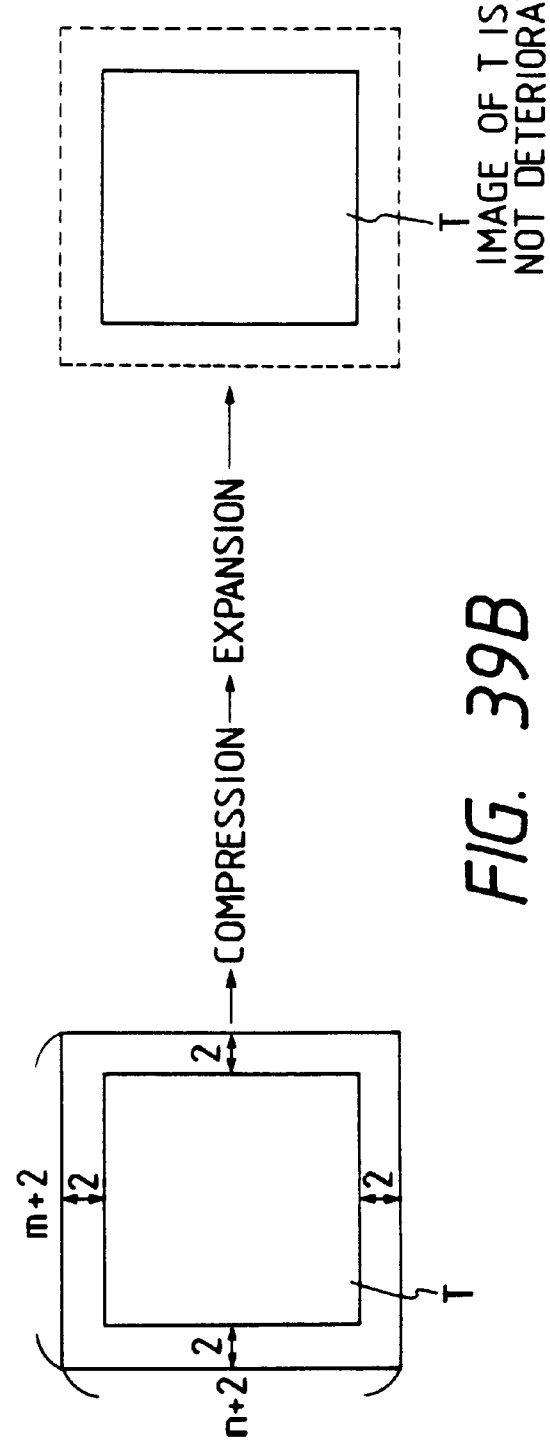

At this time, if one block E associated with block transfer is defined as follows:

$$E = T = U \odot V$$

and data is transferred, data deterioration occurs. If differences are calculated within the following range:

$$E = T \odot U$$

data deterioration does not occur. This is shown in FIG. 39.

The block data compressed by the ICU 22 is transferred to a line through a communication line or communication line network 80. This line is preferably a high-speed digital line such as an ISDN network. A data communication protocol is specified as needed.

Figure 5:
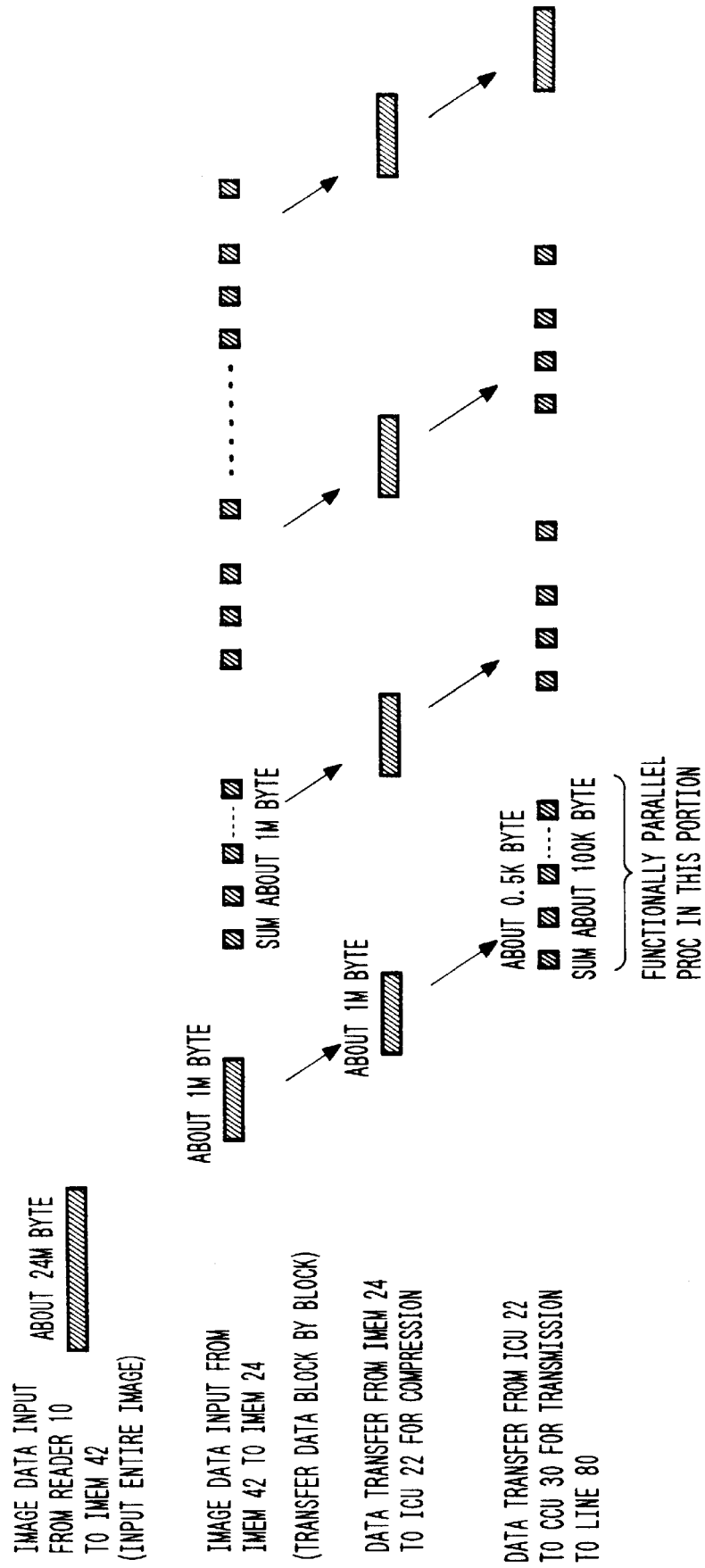
FIG. 5 is a view showing transmission-side timings.

This processing requires about 12.5 seconds for block data of about 1 byte even if an ISDN line requiring a transmission speed of 64 bps is used. In this embodiment, this processing is divided such that the current block is processed functionally parallelly with transfer of the next block from the IMEM 42 to the IMEM 24 on the main body side. More specifically, as shown in FIG. 5, data transfer to a communication line can be functionally parallelly performed with data fetch to the main body side, thereby increasing total processing speed. This processing continues until all the blocks are compressed by the above method and are transmitted onto the communication line 80. When all the blocks are transferred, the flow returns to step S1 through steps S6 and S7. The apparatus is then ready for receiving the next data.

Figure 6:
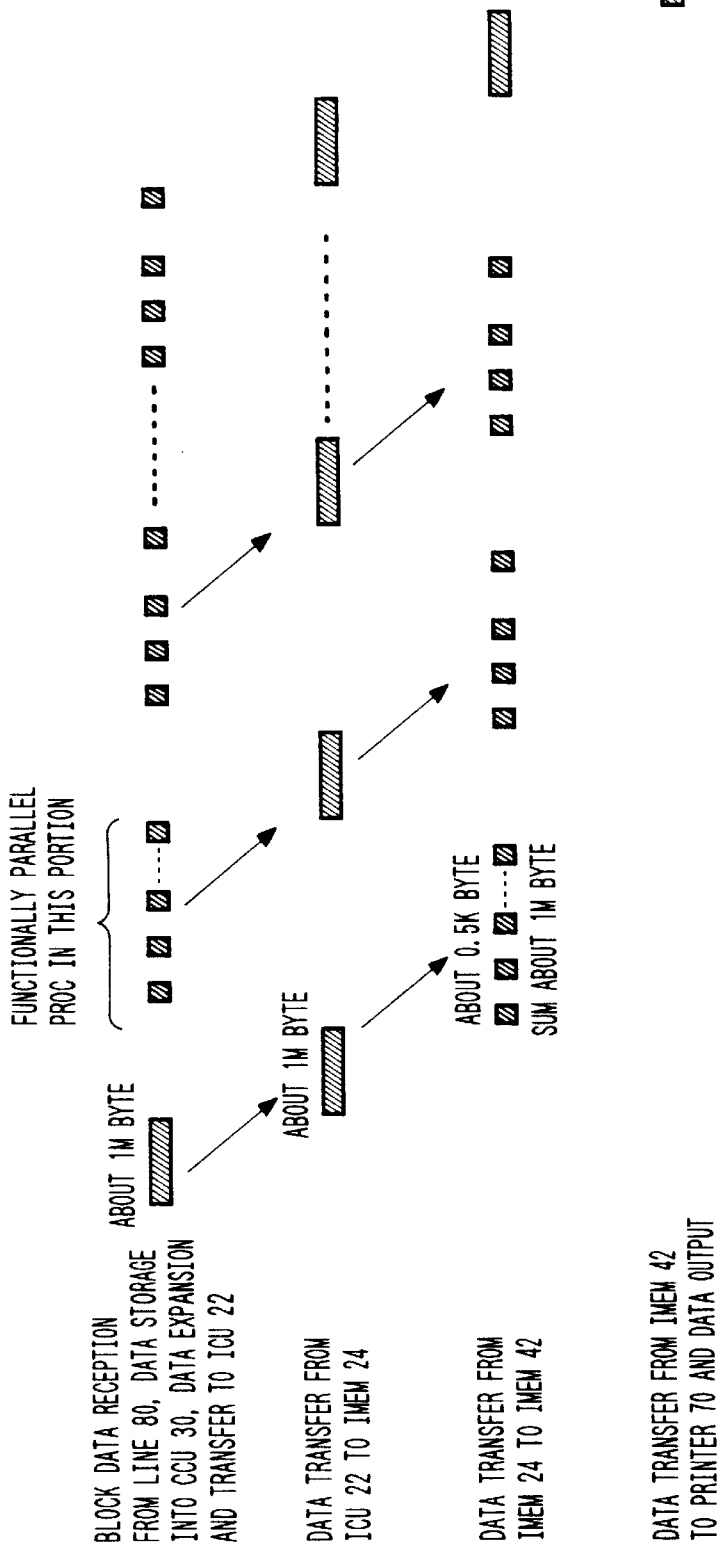
FIG. 6 is a view showing reception-side timings.

On the other hand, on the reception side, the above operations are reversed in order. In step R1 in FIG. 4, data is received block by block from the communication line 80. The received data is expanded by the ICU 22 and is transferred to the IMEM 42 in the printer through the IMEM 24. At this time, as shown in FIG. 6, processing for receiving data from the communication line 80 is performed functionally parallelly with processing for transferring data from the IMEM 24 to the IMEM 42 in the printer, thereby increasing the processing speed. Of all the expanded block images, the above-mentioned portion subjected to image deterioration, i.e., the enlarged portion (i.e., two upper pixels, two lower pixels, two right pixels, and two left pixels) are removed, and the resultant block images are stored in the IMEM 24 again. The block transfer images are synthesized into one image in the IMEM 24. As described above, the portion subjected to image deterioration is removed from the data stored in the IMEM 24.

It is determined in step R2 whether all the blocks are transferred to the IMEM 42. If NO in step R2, the above processing is repeated. However, if YES in step R2, the block images are synthesized in steps R3 and R4, and the integral image is output to the printer 70. In this state, the reception side is ready for receiving the next data.

Figure 7:
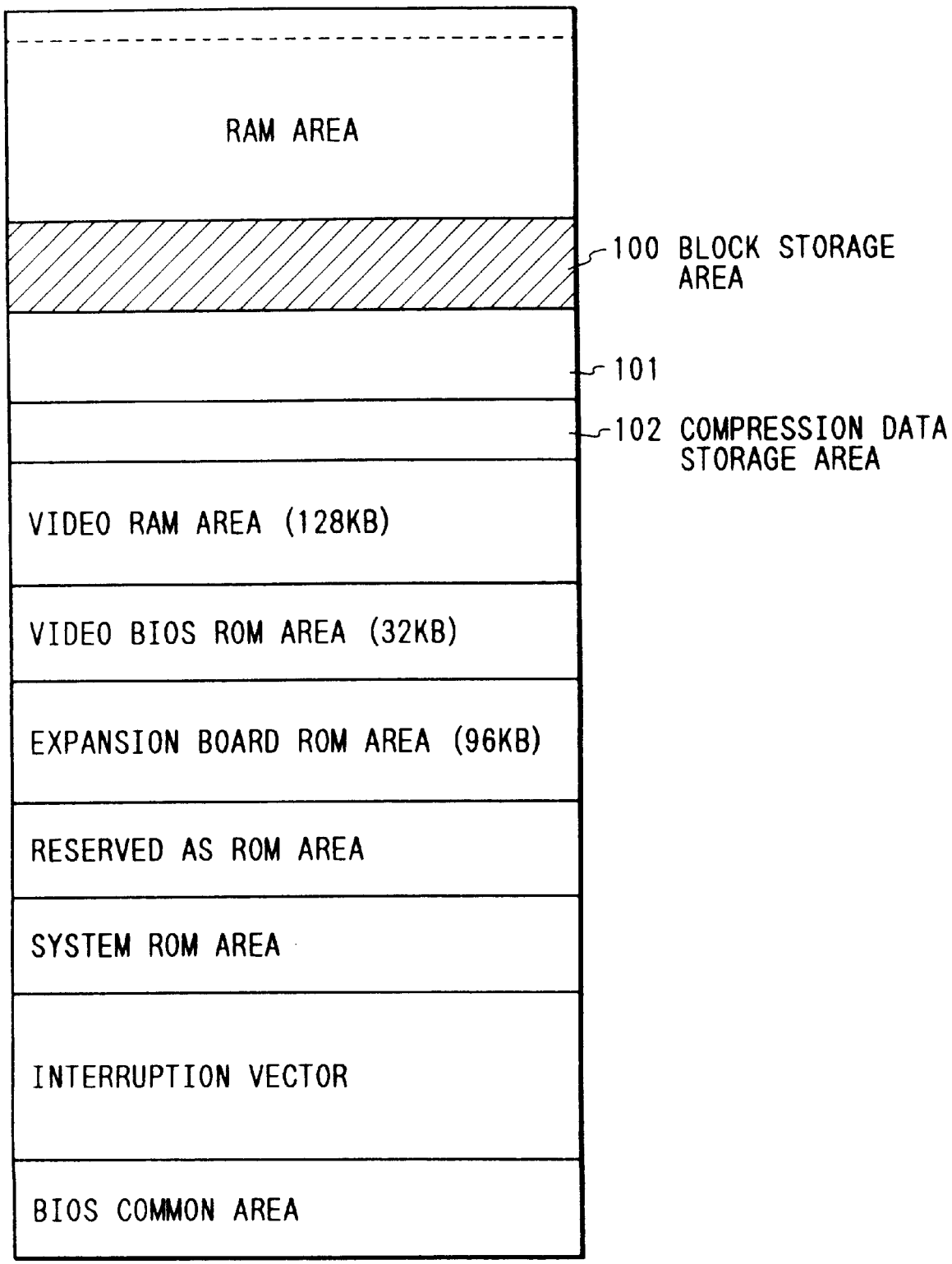
FIG. 7 is a view showing a memory map of this embodiment.

In FIG. 1, the VRAM 25, the PMEM 23, and the IMEM 24 are illustrated as separate functional blocks. However, these memories can be constituted by a single memory. FIG. 7 is a view showing a memory map employing the single memory. Referring to FIG. 7, block data (1 Mbyte) transferred from the IMEM 42 in the reader/printer unit 40 is stored in an area 100. When one-block color image data is completely stored, one-block data of the area 100 is transferred to an area 101. The next block data from the IMEM 42 is stored in the area 100. During this period, the one-block data stored in the area 101 is compressed (encoded) by the ICU 22, and the compressed data is stored in an area 102. The data is transmitted from the area 101 to the ISDN line 80 through the CCU 30.

Figure 8:
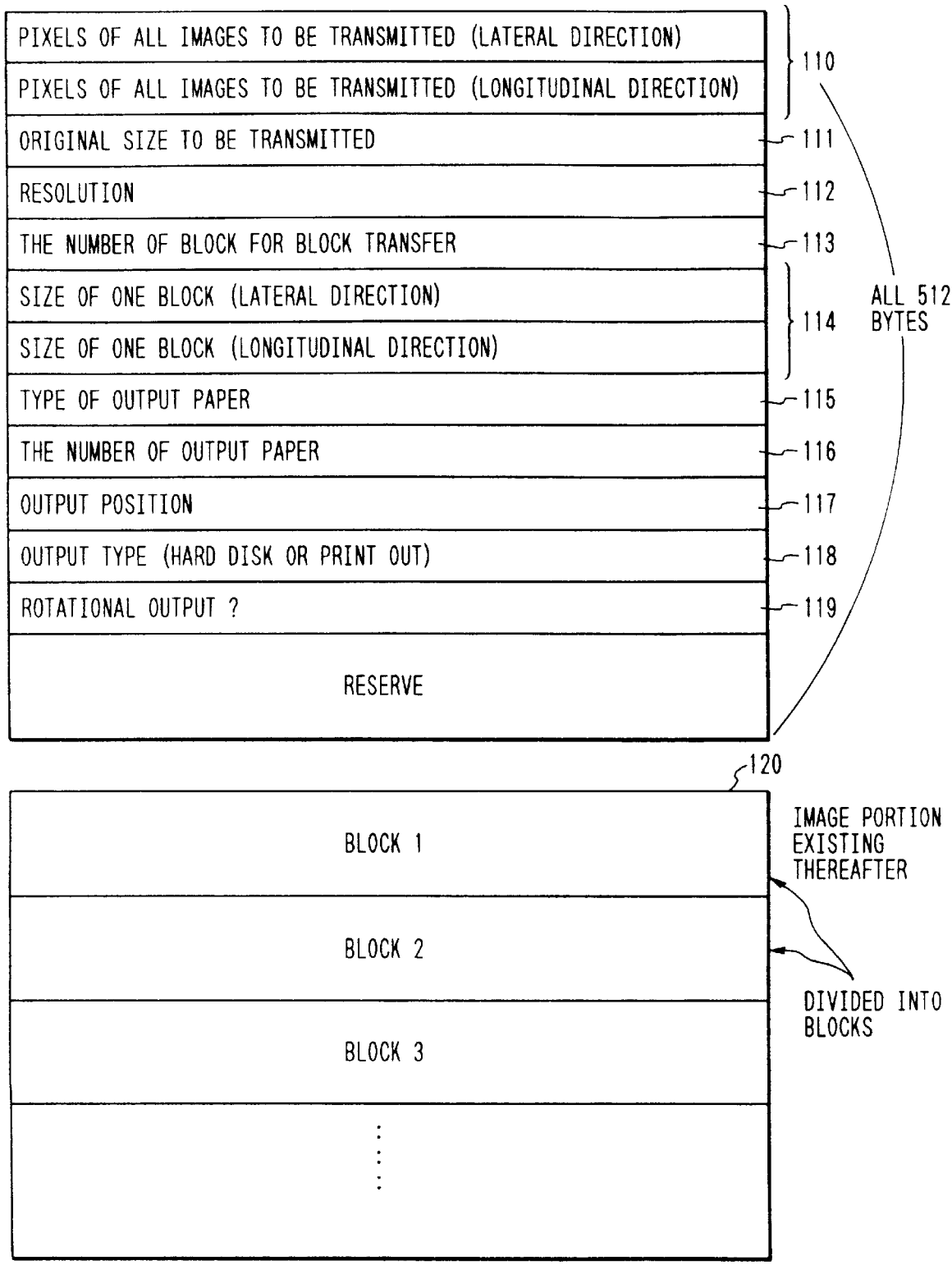
FIG. 8 is a view showing a format of an image header.

An arrangement of data transmitted onto the ISDN line 80 is shown in FIG. 8.

Image header information is transmitted by a protocol before the encoded compressed color data. The image header information is constituted by information 110 representing the numbers of pixels (longitudinal and lateral directions) of all images to be transmitted, information 111 representing an original size, information 112 representing a resolution, information 113 representing the number of divided blocks, information 114 representing sizes (longitudinal and lateral directions) of one block, information 115 representing the type of output paper, information 116 representing the number of output paper, information 117 representing an output position on the reception-side recording paper, information 118 representing an output type (data is stored in a reception-side hard disk or data is printed out), and information 119 representing whether color image data is rotated and output on the reception side.

Data compressed in units of blocks are sequentially output by the above block processing. Transmission and reception of block data are checked block by block by the communication protocol.

Detailed operations according to this embodiment will be described with reference to FIGS. 9 to 27.

Figure 9:
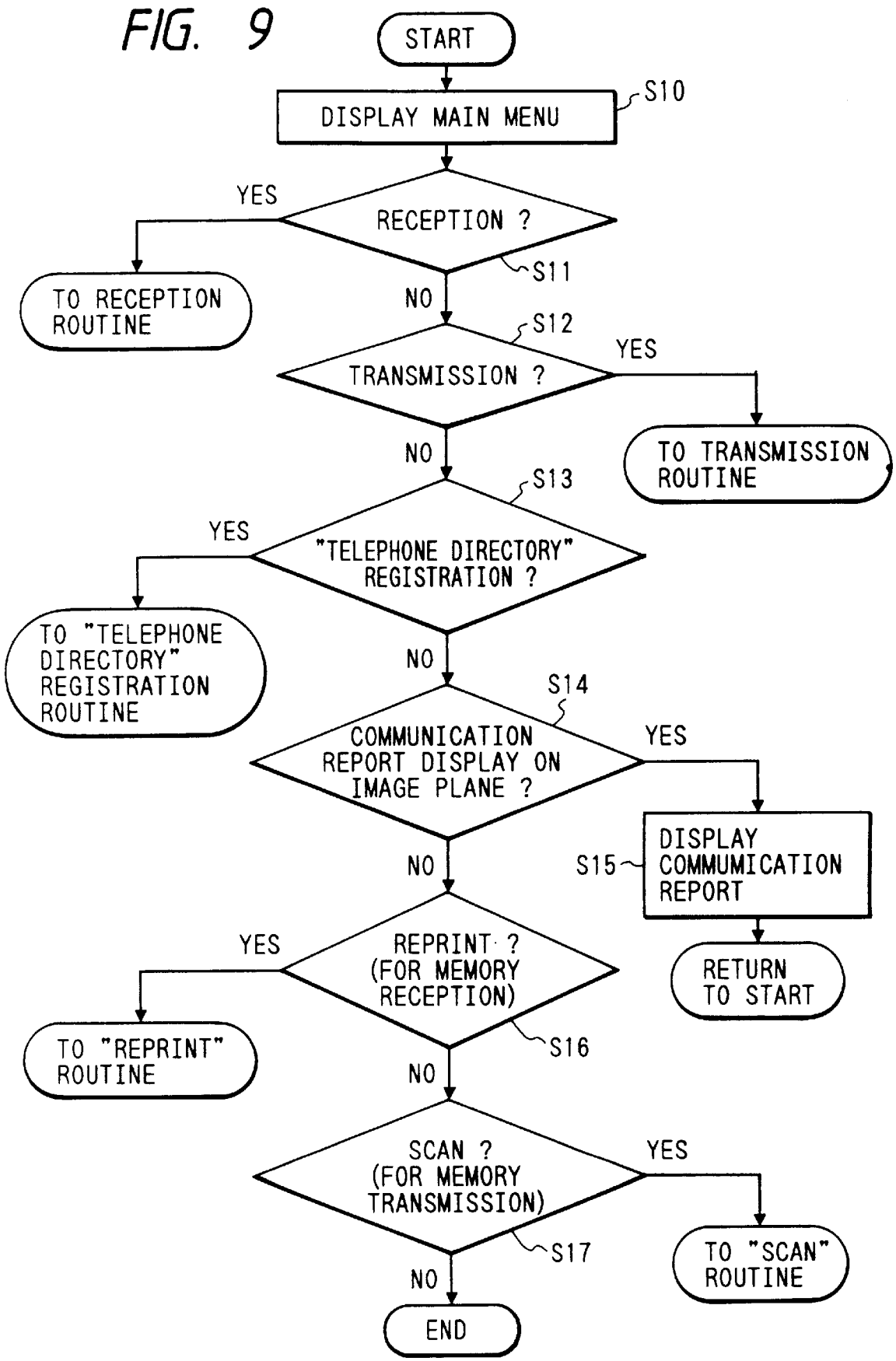
FIG. 9 is a flow chart showing a detailed control operation of this embodiment.
Figure 10:
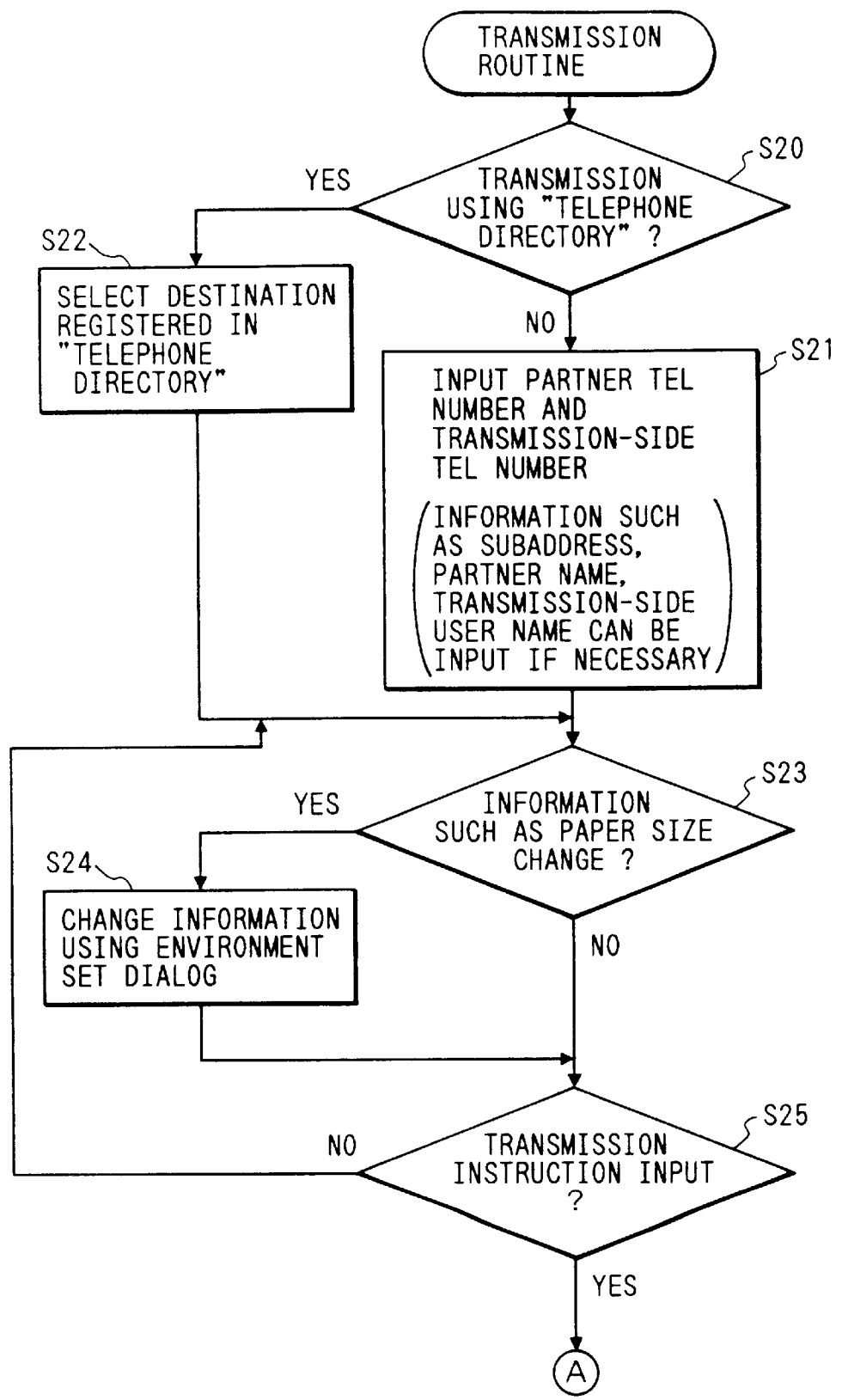
FIG. 10 is a flow chart showing another detailed control operation of this embodiment.
Figure 11:
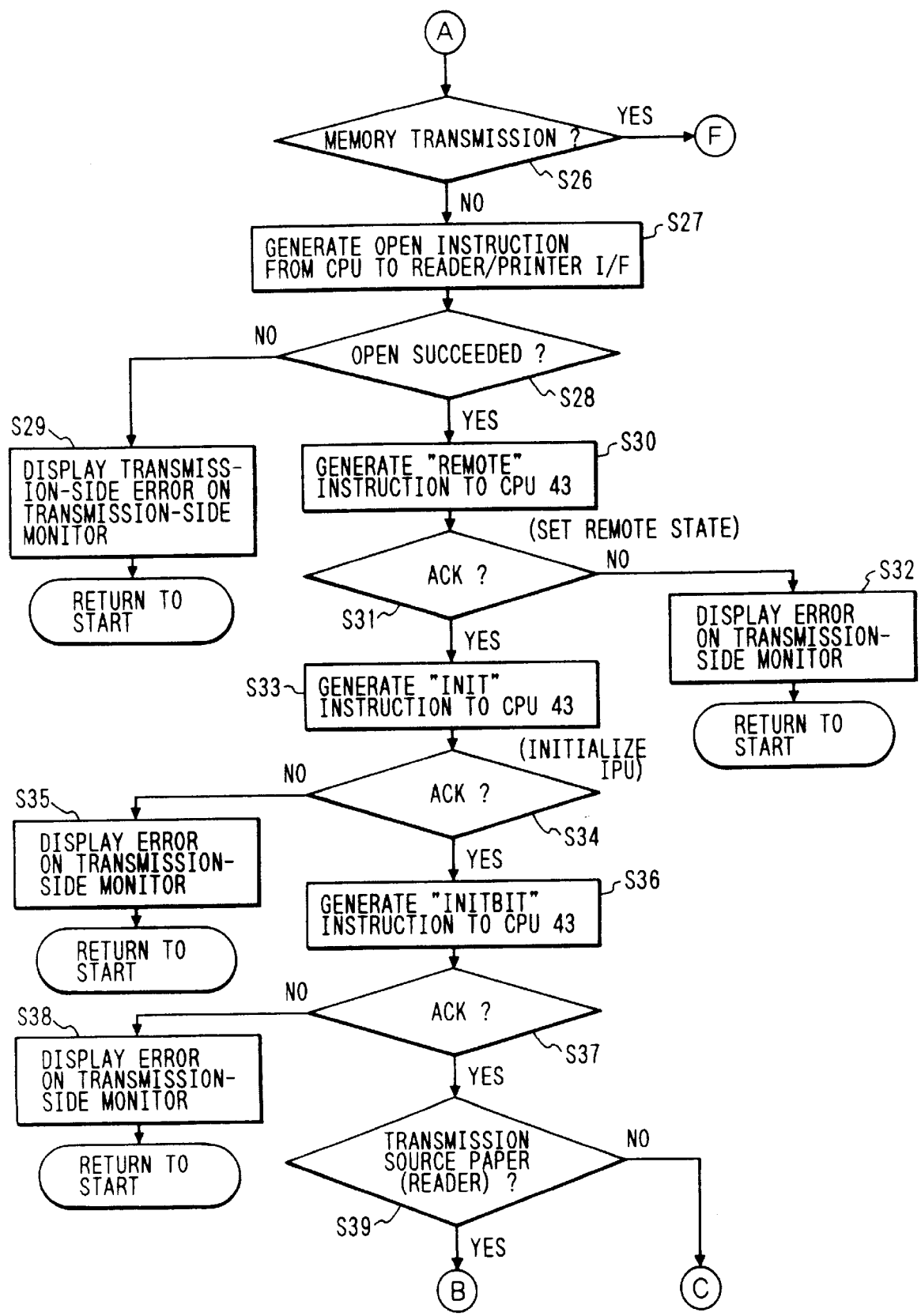
FIG. 11 is a flow chart showing still another detailed control operation of this embodiment.
Figure 12:
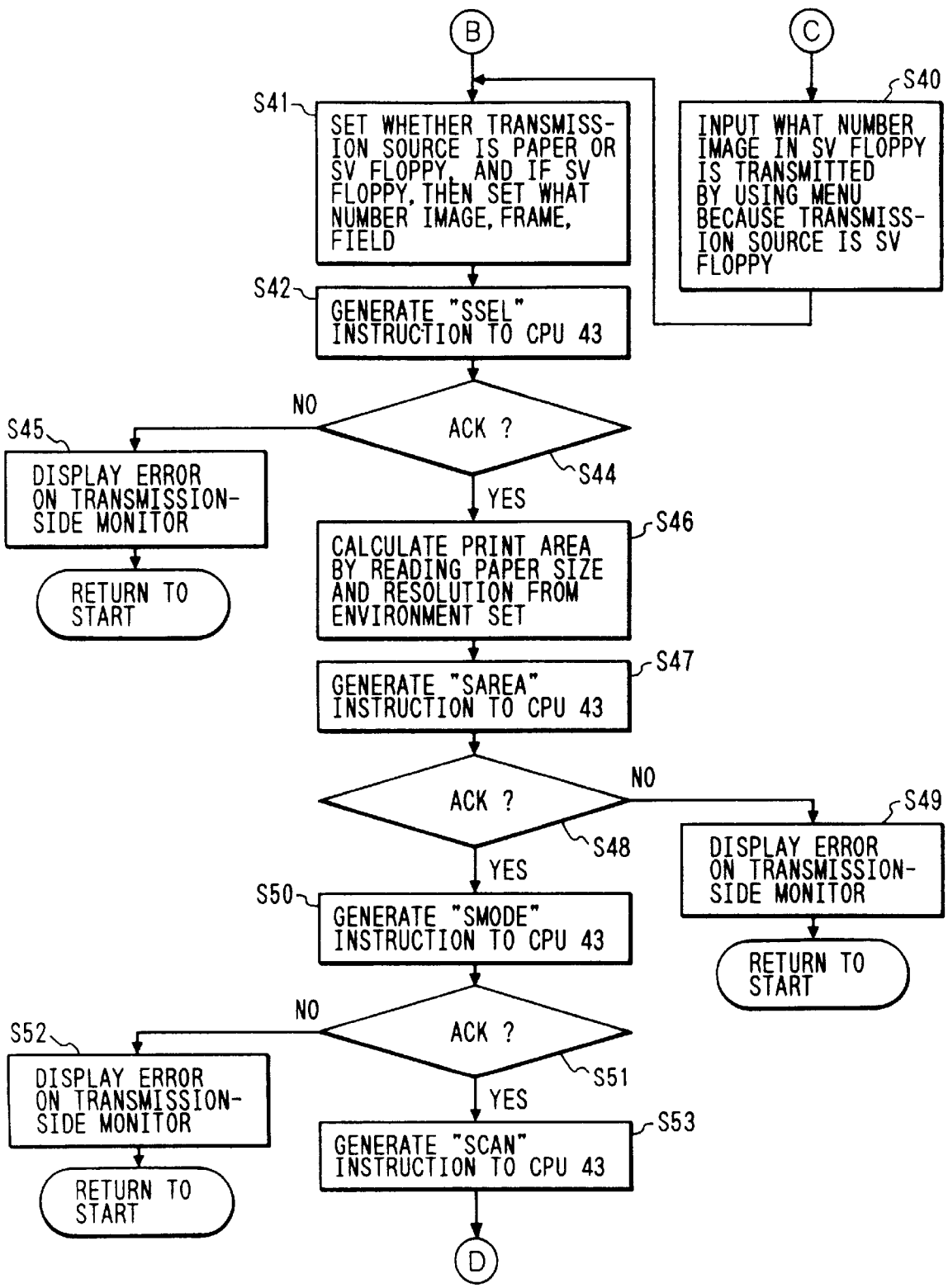
FIG. 12 is a flow chart showing still another detailed control operation of this embodiment.
Figure 13:
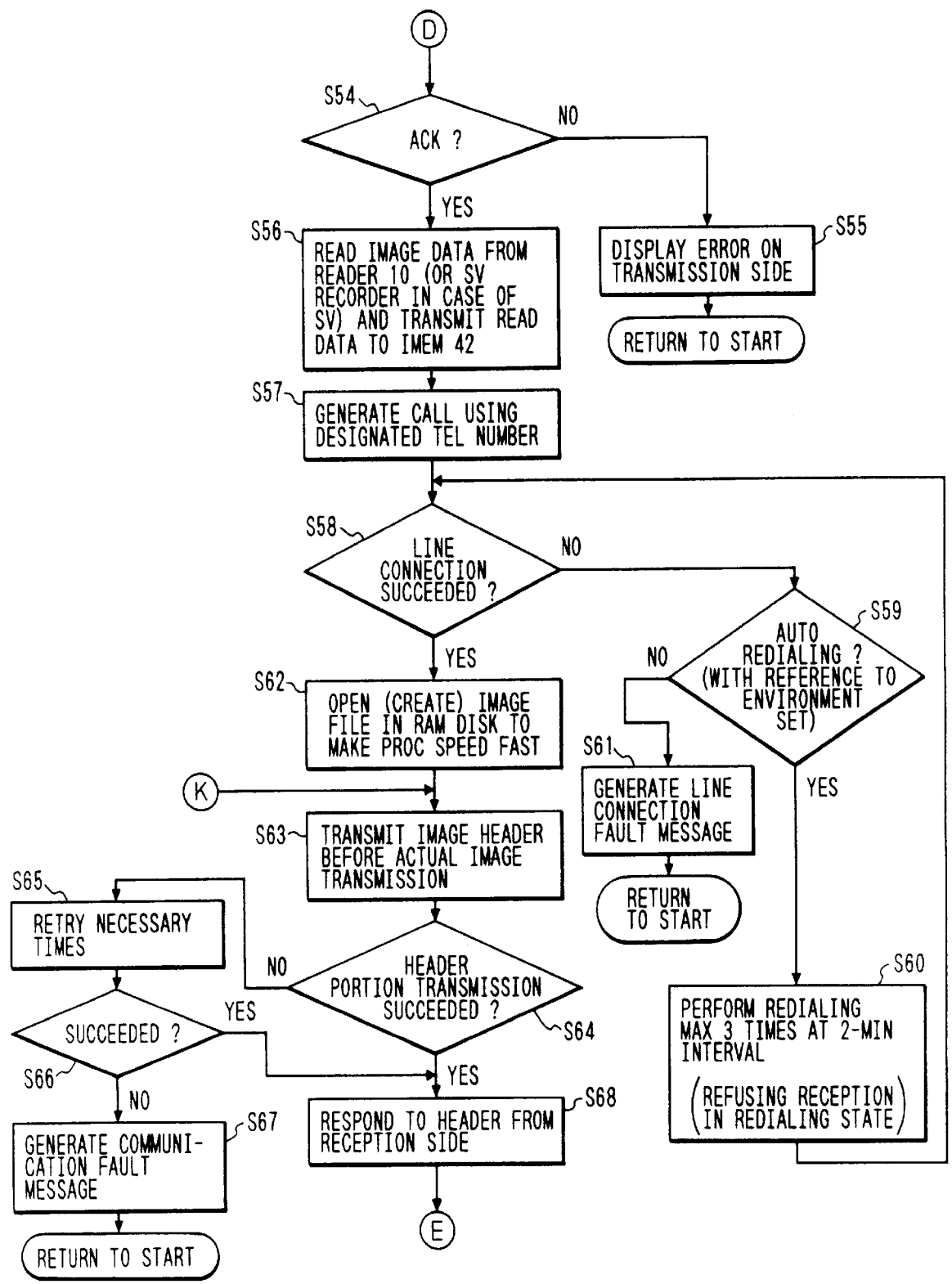
FIG. 13 is a flow chart showing still another detailed control operation of this embodiment.

FIG. 9 is a main flow of the CPU 26. In step S10, a main menu image plane (FIG. 28) is displayed. One of F1 to F6 in FIG. 28 is selected on the keyboard 61, and a transmission partner is input and a transmission mode is set with the keyboard 61.

Figure 38:
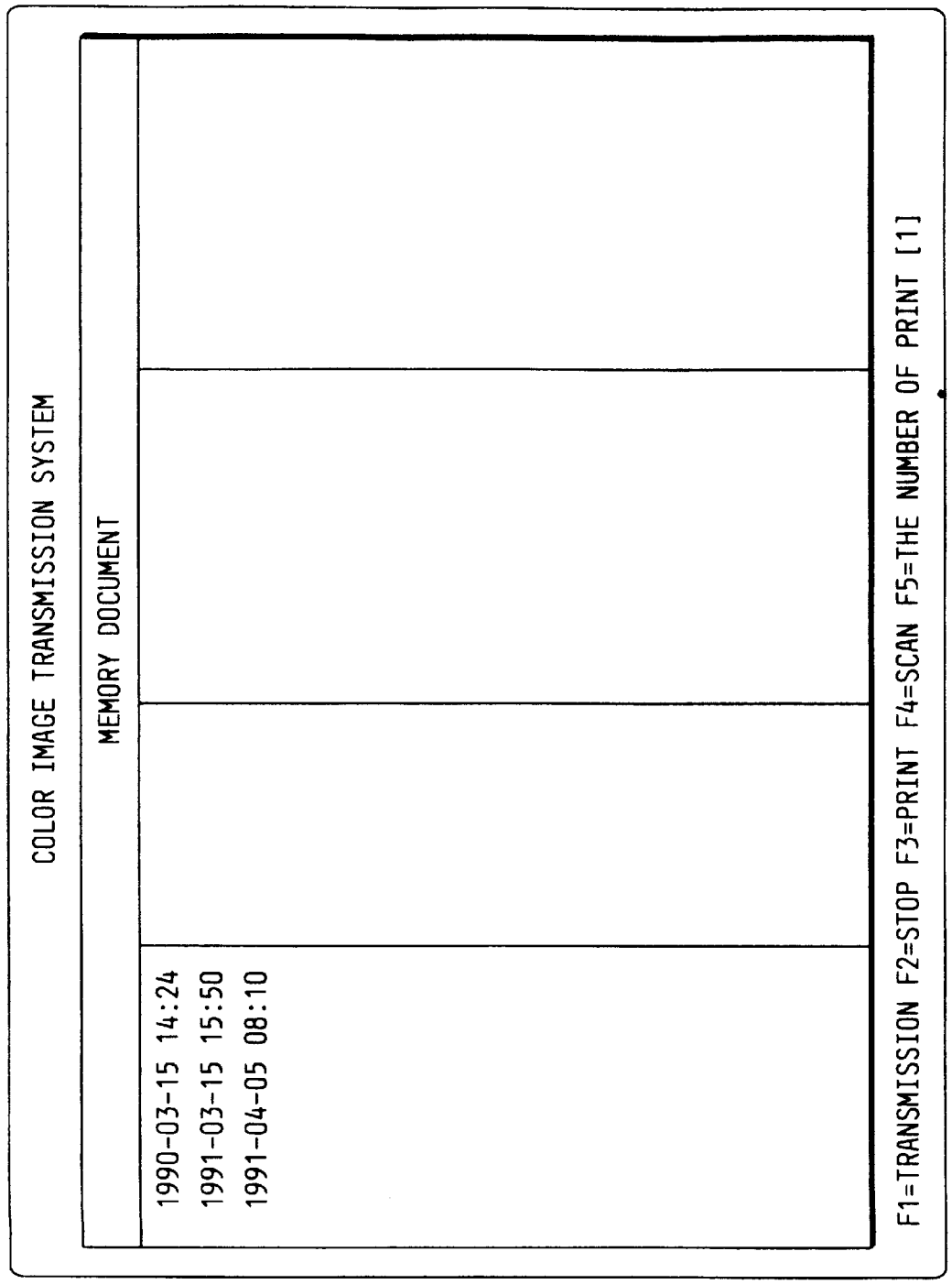
FIG. 38 is a view showing still another display content of this embodiment.

It is determined in step S11 whether a communication request (incoming call) is received from the line 80. If YES in step S11, the flow advances to a reception routine in FIGS. 18 to 24. If transmission is designated in step S12 (i.e., designation of F1 in FIG. 28), the flow advances to a transmission routine in FIGS. 10 to 17. If telephone directory registration is designated (i.e., designation of F5 in FIG. 28) in step S13, the flow advances to a telephone directory registration routine in FIG. 27. If a report output is designated (i.e., designation of F3 in FIG. 28) in step S14, a communication report shown in FIG. 34 is displayed on the CRT 60 or recorded and printed out at the printer 70 in the reader-printer unit 40 in step S15. If printing of the color image data stored in the hard disk 50 is designated (i.e., designation of F6 in FIG. 28) in step S16, a list of image data (FIG. 38) in the hard disk is displayed, and the flow then advances to a reprint routine.

In step S17, when image data read by the reader 10 in the reader-printer unit 40 is designated to be stored in the hard disk device 50 to perform memory transmission, the flow advances to a scan routine.

The transmission routine will be described below.

The flow advances to step S20 to determine whether transmission using a telephone directory is designated (i.e., designation of F4 of FIG. 28). If YES in step S20, a telephone directory image plane shown in FIG. 29 is displayed. When a destination is designated with the keyboard 61 or the pointing device 62, it is determined in step S23 whether a paper size (A3, B4, or A4), a resolution (100 dpi, 200 dpi, or 400 dpi), auto dialing information, and transmission-side information are added or not, memory transmission is selected or not, and a change in selection of memory reception is present or not.

Figure 41A:
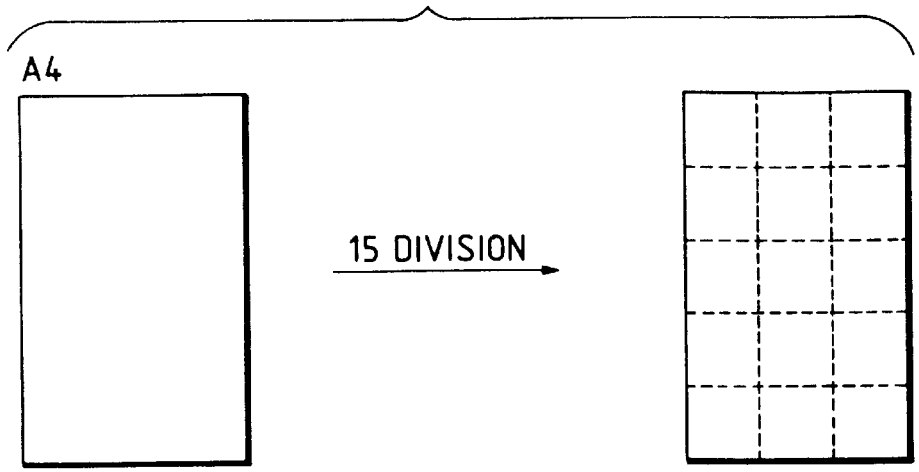
FIGS. 41A and 41B are views showing the numbers of divided blocks in accordance with different original sizes.
Figure 41B:
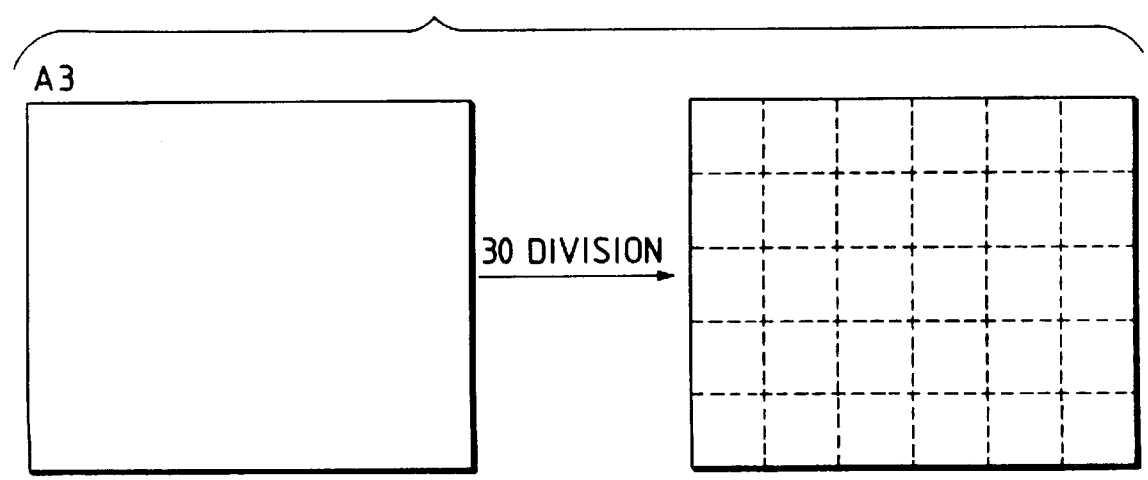

If the paper size (i.e., an original size) is A4, one image is divided into 15 blocks in FIG. 41A. One image is divided into 30 blocks for an A3 size shown in FIG. 41B. In this manner, a division number N is changed in accordance with the original size.

If the original is of A4 size, 15 blocks are set at a resolution of 200 dpi as in a fine mode, and 30 blocks are set at a resolution of 400 dpi as in a superfine mode. In this manner, the division number N is changed in accordance with the resolution.

When a change is input, an environment set dialogue shown in FIG. 35 is displayed on the CRT 60 in step S24, and a change in setup of the transmission mode is performed in accordance with the change in input by the operator. If a transmission designation input (input of F1) is made in step S24, the flow advances to step S26 in FIG. 11.

If telephone directory transmission is not designated in step S20, inputs of a partner telephone number, a sub address (which need not be designated), a partner name (which need not be designated), a transmission-side user name (which need not be designated), and a transmission-side telephone number (which need not be designated) are accepted, and the flow advances to step S23.

It is determined in step S23 whether inputs for changes in communication mode set information such as the paper size and the resolution are made. If YES in step S23, the flow advances to step S24 to display the environment set dialogue shown in FIG. 35 is displayed on the CRT 60, thereby accepting the inputs of changes in communication mode. It is determined in step S25 whether a transmission designation input is made (designation of F1' in FIG. 28). If YES in step S25, the flow advances to step S26. Otherwise, the flow returns to step S23. When transmission is designated by the operator, it is determined in step S26 whether a memory transmission mode is designated. If YES in step S26, the flow advances to step S82. Otherwise, the flow advances to step S27 and subsequent steps to perform direct transmission.

An "OPEN" instruction is output to the reader/printer unit 40 through the reader/printer I/Fs 21 and 41 in step S27. Note that this "OPEN" instruction is a signal for starting communication with the CPU 43 in the reader/printer unit 40. It is determined in step S28 whether communication with the CPU 43 in the reader/printer unit 40 is successful. If NO in step S28, an interface error is displayed (display representing that communication between the CPUs is unsuccessful) on the CRT 60 in step S29, and the flow then returns to the start. If communication with the CPU 43 in the reader/printer unit 40 is successful, a "REMOTE" instruction (an instruction for setting a remote mode for remote-operating the reader/printer unit 40 from the main body 20) is generated and transmitted to the CPU 43 in step S30. It is determined in step S31 whether an ACK signal is received from the CPU 43 within a predetermined period of time. If NO in step S31, the flow advances to step S32 to display an error on the CRT 60, and the flow returns to the start. However, when the ACK signal is received, an "INIT" instruction is generated and transmitted to the CPU 43 in step S33 to cause the CPU 43 to initialize the reader/printer unit 40. It is determined in step S34 whether the ACK signal is received from the CPU 43 in response to the "INIT" instruction. If reception of the ACK signal is not detected, an error is displayed on the CRT 60 in step S35, and the flow returns to the start. If reception of the ACK signal is detected in step S34, an "INITBIT" instruction is generated and transmitted to the CPU 43 in step S36, thereby causing the CPU 43 to initialize the IMEM 42. It is determined in step S37 whether an ACK signal from the CPU 43 is received in response to the "INITBIT" instruction. If no reception of the ACK signal is detected, an error is displayed on the CRT 60 in step S38, and the flow returns to the start. However, if reception of the ACK signal is detected, it is determined in step S39 that a source of color image data is an SV system 45. In step S40, an input representing what number image of the floppy disk in the SV system 45 is transmitted is received. If the source of the color image data is determined to be the reader 10, data representing whether the source of the color image data is the reader 10 or the SV system 45 is set in an "SSEL" instruction in step S41. In the case of the SV system, data representing what number image of the floppy disk is transmitted is also set in the "SSEL" instruction. The "SSEL" instruction (this instruction is an instruction for selecting color image data to be generated and transmitted to the main body 20 under the control of the CPU 43; for example, if data representing the reader 10 is set in this instruction, the CPU 43 sends the color image data read by the reader 10 to the main body 20) is generated and transmitted to the CPU 43 in step S42. It is determined in step S44 whether an ACK signal in response to the SSEL instruction is received. If no reception of the ACK signal from the CPU 43 is detected, an error is displayed on the CRT 60 in step S45, and the flow returns to the start. However, if reception of the ACK signal is detected, pieces of information such as a paper size and a resolution set in the environment set dialogue shown in FIG. 35 are read, a print area of the color image data printed on the receiving-side recording paper is calculated, and a print area in which the color image data is printed on the designated paper is calculated in step S46. Data for designating an output position of the paper and a data quantity are set in an "SAREA" instruction in accordance with the calculated print area information. In step S47, the "SAREA" instruction is generated and transmitted to the CPU 43. It is determined in step S48 whether an ACK signal from the CPU 43 in the reader/printer unit 40 is received. If no reception of the ACK signal is detected, an error is displayed on the CRT 60 in step S49, and the flow returns to the start. However, if reception of the ACK signal is present, an "SMODE" instruction in which resolution data is set is generated and transmitted to the CPU 43 in step S50. It is determined in step S51 whether an ACK signal is received. If no reception of the ACK signal is detected, an error is displayed on the CRT 60 in step S52, and the flow returns to the start. However, if reception of the ACK signal is detected, a "SCAN" instruction (an instruction for starting input scanning of color image data) for storing the color image data in the IMEM 42 is generated and transmitted to the CPU 43 in step S53. It is determined in step S54 whether an ACK signal is received. If reception of the ACK signal is detected, the flow advances to step S56. However, if no reception of the ACK signal is detected, an error is displayed on the CRT 60 in step S55, and the flow returns to the start.

In step S56, the CPU 43 stores the color image data from the reader 10 (or the SV system 45) in the IMEM 42. A call using a partner telephone number designated by the operator is generated for the ISDN line 80 in step S57. It is determined in step S58 whether line connection with the called partner is succeeded. If NO in step S58, auto redialing is performed a maximum of N times (a maximum of three times) at a 2-min interval in steps S59 and S60. If the line connection is not succeeded upon auto redialing N times, a line connection fault message is displayed on the CRT 60 in step S61, and the flow returns to the start. When the line connection with the called partner is succeeded, the block storage area 100 is assured in the RAM area shown in FIG. 7 in step S62. The image header information (FIG. 8) is generated and transmitted to the partner through the ISDN line 80 in step S63. It is determined in step S64 whether transmission of the image header unit is succeeded. If NO in step S64, and if a communication fault occurs even if transmission of the image header is retried a predetermined number of times, i.e., retry necessary times, in steps S65 and S66, a communication fault message is displayed on the CRT 60 in step S67. The flow then returns to the start. However, if transmission of the image header is succeeded, a response signal (response header) for the transmitted image header is received from the reception side in steps S68 and S69. It is determined in step S70 whether reception of the response header (i.e., header unit reception) is succeeded. If NO in step S70, and if a communication fault occurs even after reception of the response header is retried a predetermined number of times, i.e., retry necessary times, in steps S71 and S72, a communication fault message is displayed on the CRT 60 in step S73, and the flow returns to the start. If reception of the response header is succeeded, it is determined in step S74 whether the transmitted image header coincides with the response header (i.e., header unit information coincides). If NO in step S74, the flow advances to step S100 in FIG. 16. However, if YES in step S74, the flow advances to step S75.

It is determined in step S100 whether the partner reader/printer unit is set in a power-OFF state. If NO in step S100, it is determined in steps S101 and S107 (FIG. 17) whether the partner paper size is larger than the paper size designated at the transmission side, i.e., whether the transmission-side line size coincides with the reception-side paper size and whether the reception-side size is smaller. If YES in steps S101 and S107, the flow advances to step S75. If NO in steps S101 and S107, the flow then advances to step S108.

If the partner reader/printer unit is determined in step S100 to be set in the power-OFF state, a message representing the power-OFF state of the partner reader/printer unit is displayed on the CRT 60 in step S103. It is determined in step S104 whether memory reception is designated by the operator. If YES in step S104, an output type 118 of the image header in FIG. 8 is changed to a hard disk in step S106, and the flow returns to step S63. However, if no memory reception is designated by the operator, a transmission stop message is displayed on the CRT 60 in step S105, and the flow returns to the start. When the partner or reception-side paper size is smaller than the designated size, a display operation is performed on the CRT 60 in step S108 to make a selection among transmission with reduction (i.e., automatic transmission with reduction in accordance with the paper size), memory reception, or a transmission stop message (FIG. 36) in steps S109 to S112. If memory reception is selected by the operator, the flow advances from step S109 to S106. If transmission with reduction is selected by the operator, the flow advances from step S112 to step S63.

Figure 14:
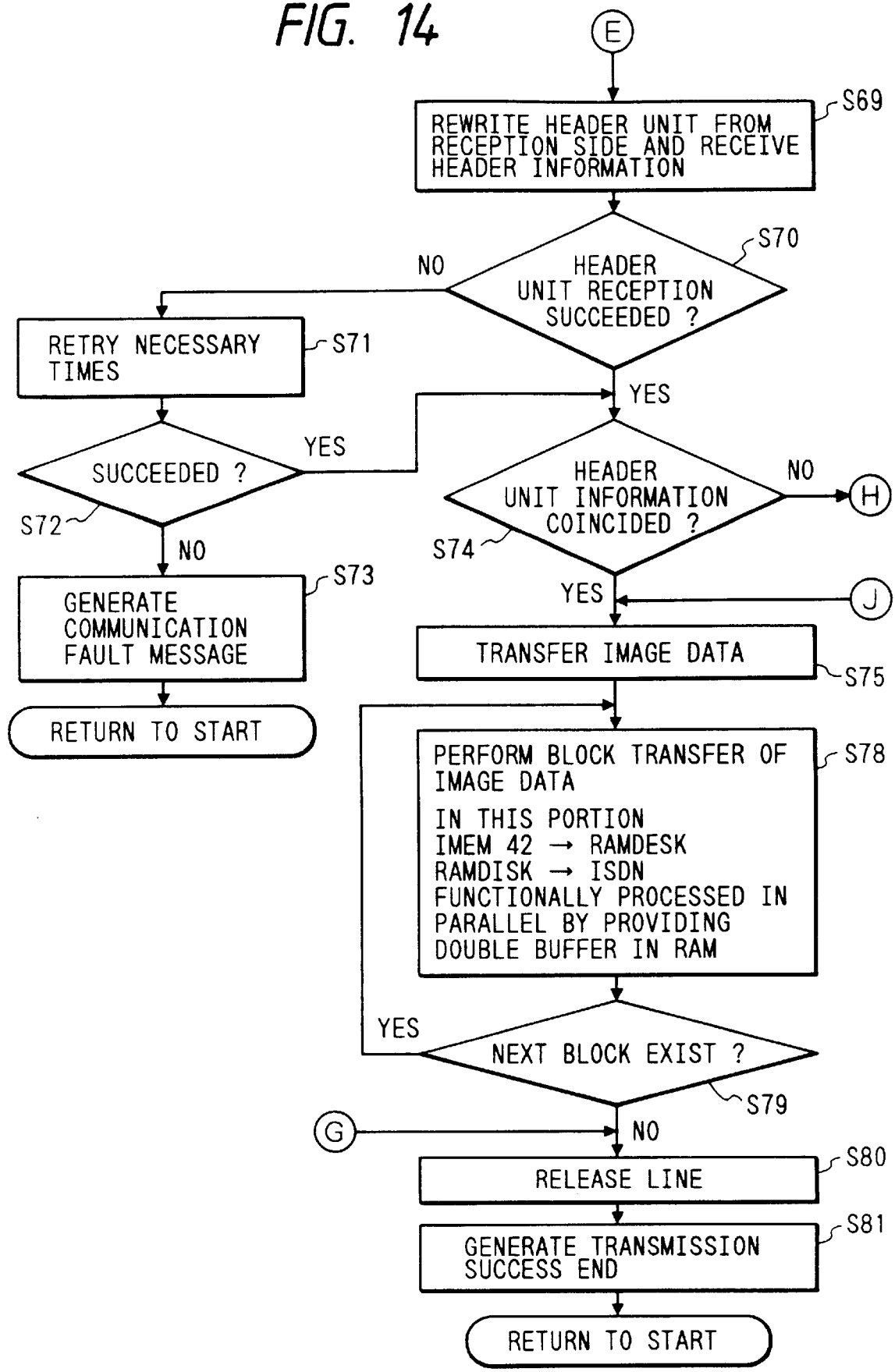
FIG. 14 is a flow chart showing still another detailed control operation of this embodiment.
Figure 15:
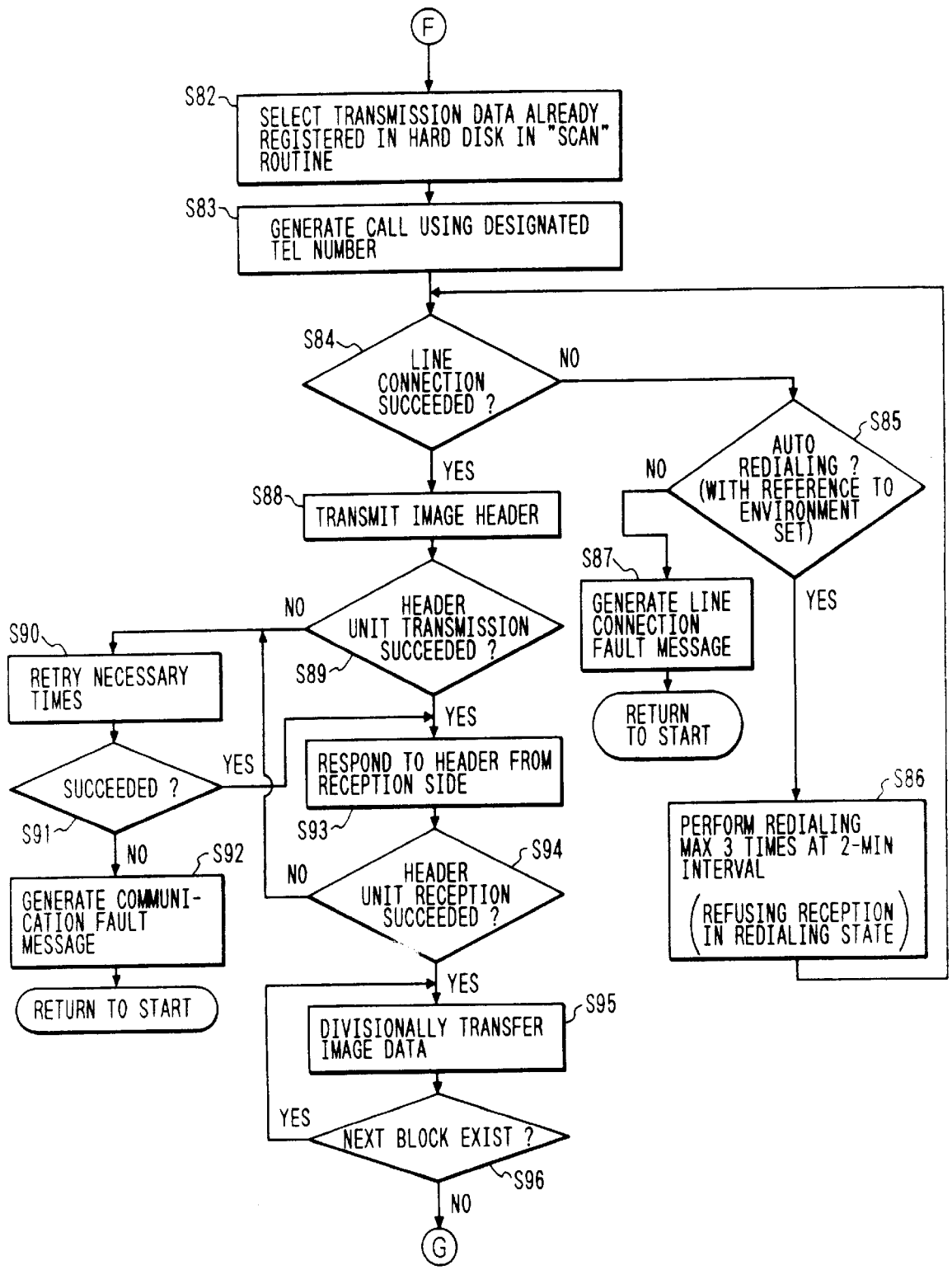
FIG. 15 is a flow chart showing still another detailed control operation of this embodiment.
Figure 16:
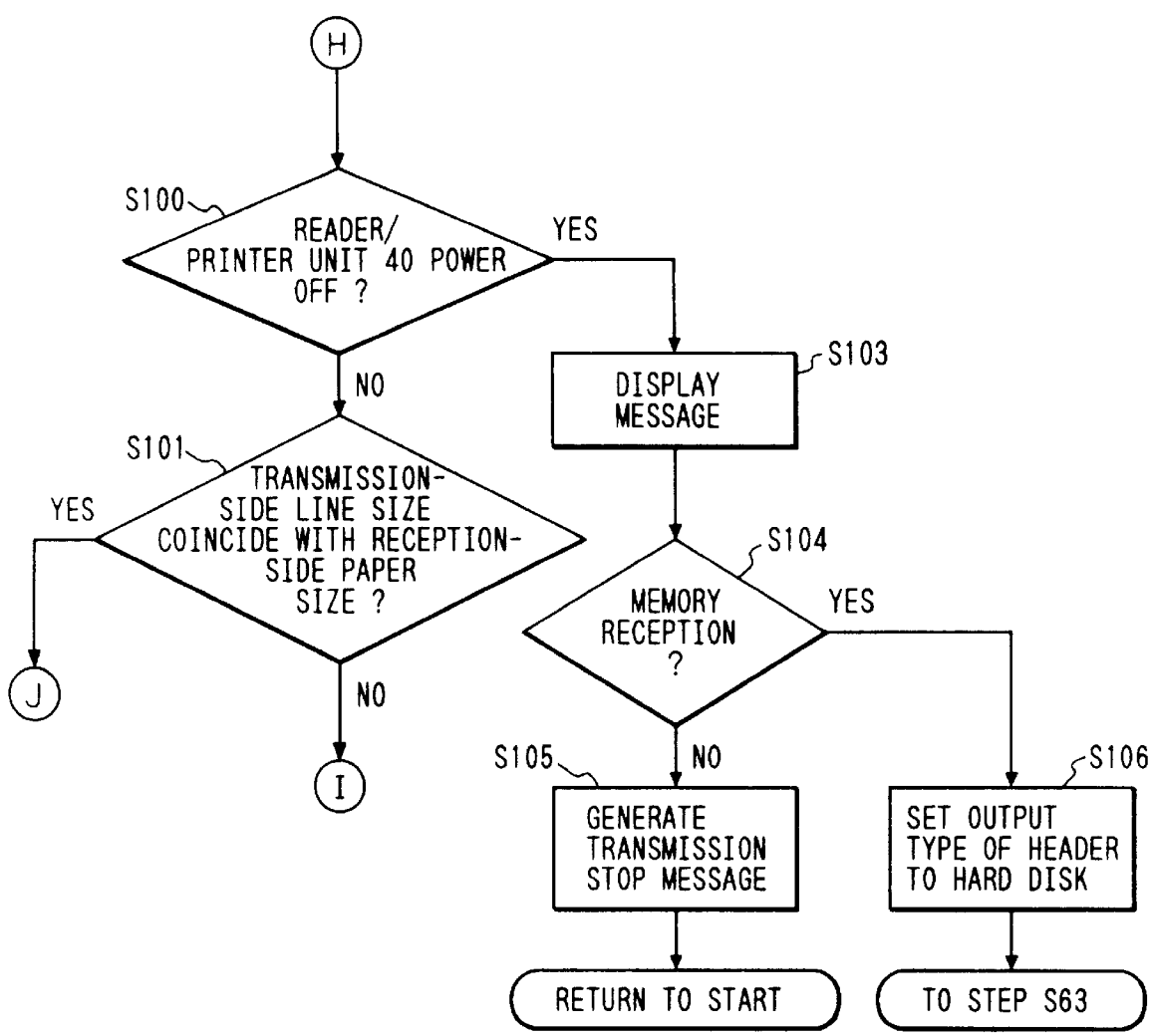
FIG. 16 is a flow chart showing still another detailed control operation of this embodiment.
Figure 17:
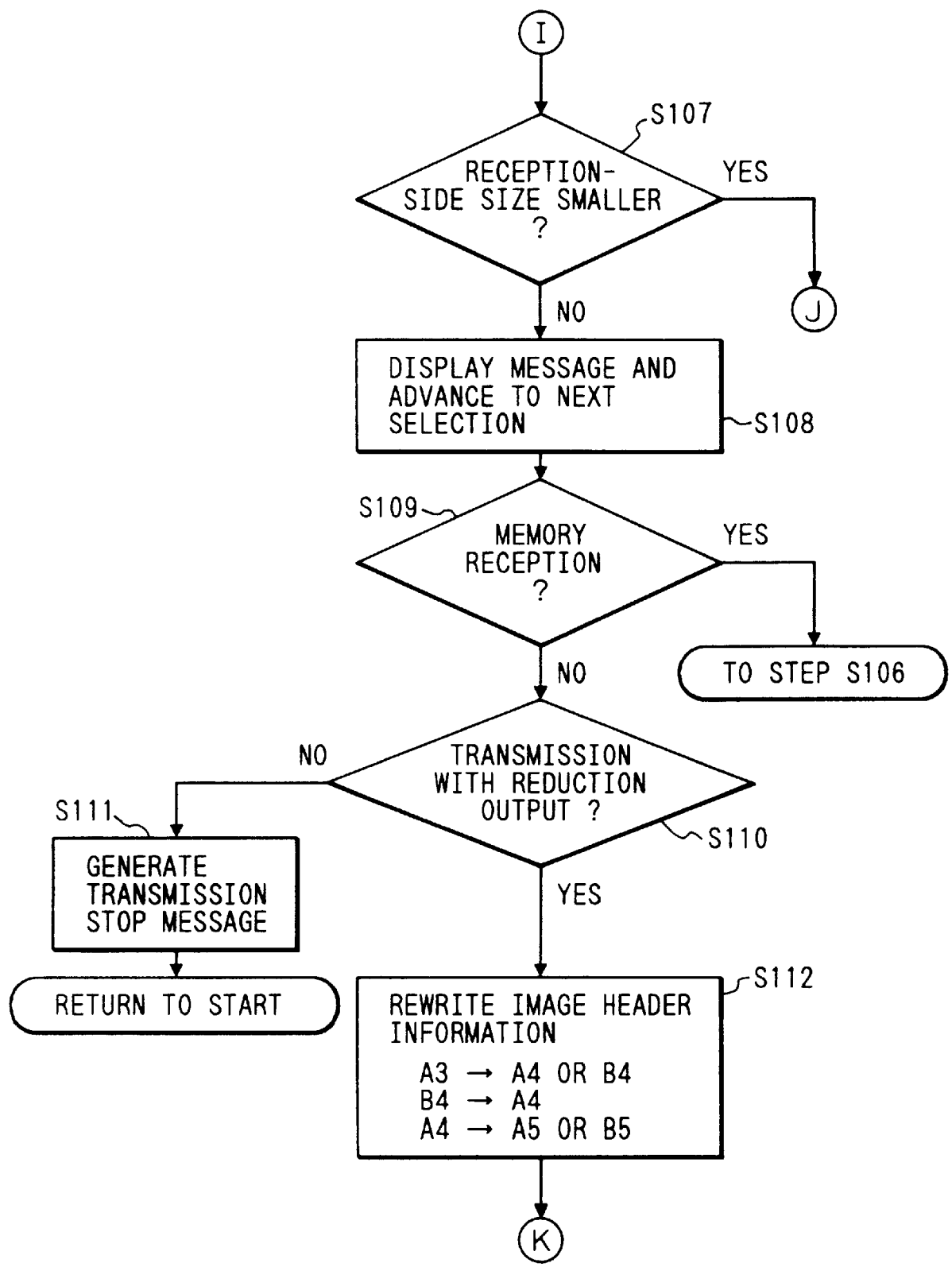
FIG. 17 is a flow chart showing still another detailed control operation of this embodiment.

The following operations are performed in steps S75, S78, and S79 of FIG. 14. The color image data stored in the IMEM 43 are transferred to the block storage area 100 (FIG. 7) block by block (every 1 Mbyte). When one-block data is stored in the block storage area 100, the one-block data of the area 100 is transferred to the area 101. Upon completion of this transfer, the next block data from the IMEM 43 is stored in the area 100, while the data in the area 101 is transferred to the ICU 22, compressed data from the ICU 22 is stored in the area 102, and the compressed data stored in the area 102 is generated and transmitted onto the ISDN line 80. In this manner, compression of the block data is performed functionally parallelly with transmission of data to the partner. When transmission of all the block data to the line 80 is completed, the ISDN line 80 is released in step S80. A transmission success end message is generated and displayed on the CRT 60 in step S81, and the flow returns to the start. However, when the flow advances from step S26 (FIG. 11) to step S82 (FIG. 15) in the memory transmission mode, transmission data already registered in the hard disk device 50 in the "SCAN" routine is selected. In step S83, a call using a designated partner telephone number is generated to access the ISDN line 80.

The same operations as in steps S58, S59, S60, and S61 are performed in steps S84, S85, S86, and S87. When a line connection with the partner is established, the image header (i.e., the header unit) shown in FIG. 8 is generated and transmitted to the partner in step S88. A transmission success is confirmed in steps S89 to S92 as in steps S64 to S67. If the header unit transmission is succeeded, a response header is received from the reception side or partner in step S93. A response header is confirmed in steps S94, S90, S91, and S92 as in steps S70 to S73. If the response header reception is succeeded, block transmission of the color image data stored in the hard disk device 50 is performed in steps S95 and S96. When all the block data are transmitted, the flow advances to step S80.

A reception routine will be described below.

Figure 18:
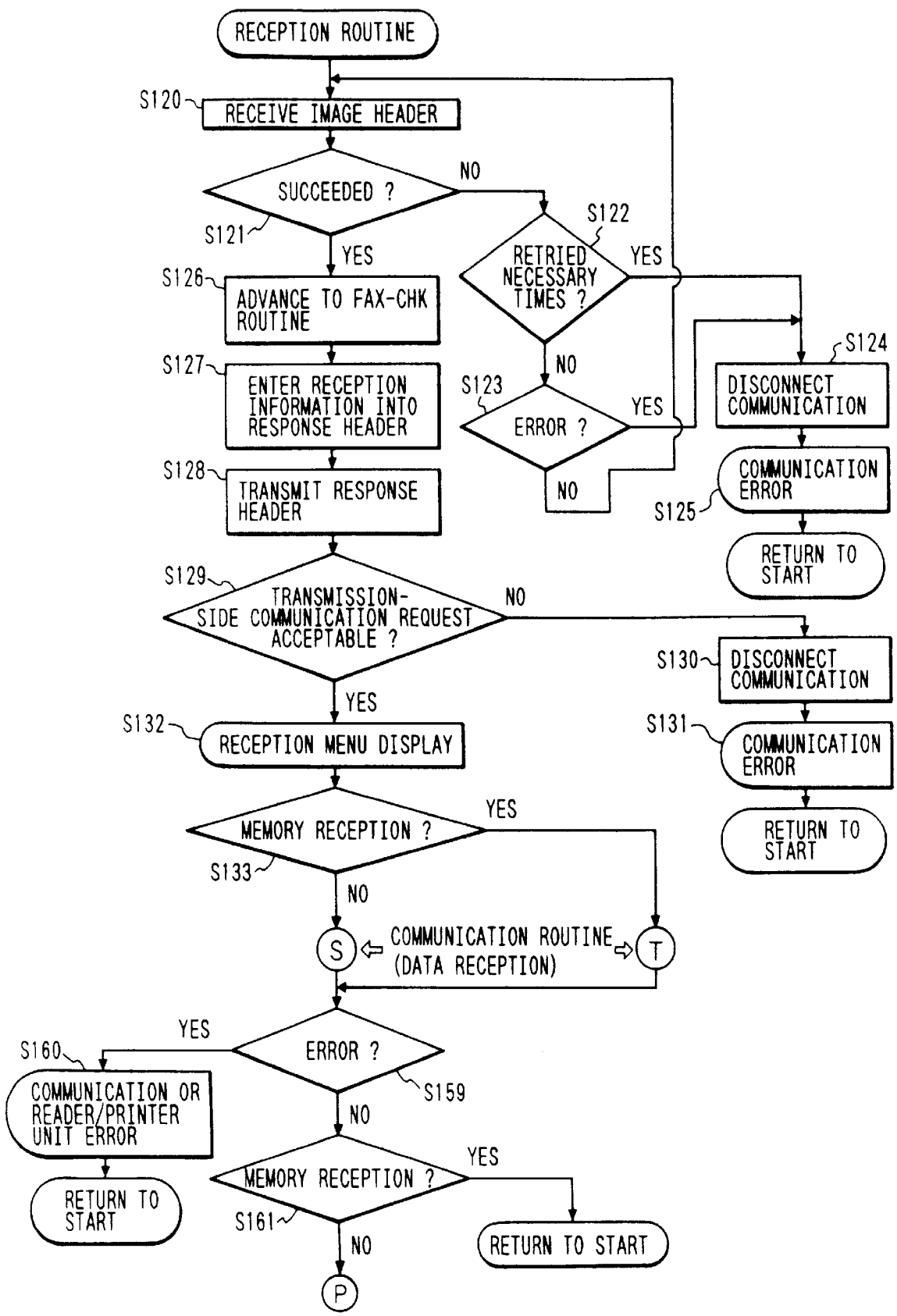
FIG. 18 is a flow chart showing still another detailed control operation of this embodiment.

When reception is determined upon reception of an incoming call in step S11 of FIG. 9, the flow advances to the reception routine in FIG. 18 to determine in steps S120 to S125 whether an image header is received from the transmission side. Reception of the image header from the transmission side is checked a predetermined or necessary times. If reception of the image header is not succeeded even if this check is retried the necessary times, communication is ended or the communication line is disconnected in step S124. A communication error is displayed on the CRT 60 in step S125, and the flow returns to the start. However, if reception of the image header is succeeded, the flow advances to a FAX-CHK routine (FIGS. 25 and 26) in step S126.

Figure 30:
FIG. 30 is a view showing still another display content of this embodiment.

It is determined in step S126-1 whether use of the hard disk is inhibited. If YES in step S126-1, data representing that use of the hard disk device 50 is inhibited is set in the RAM in step S126-3, and the flow advances to step S126-4. However, if NO in step S126-1, it is determined in step S126-2 whether the hard disk remaining capacity is equal to or larger than 3 Mbyte (MB). If YES in step S126-2, the flow advances to step S126-4. However, if NO in step S126-2, the flow advances to step S126-3. It is determined in step S126-4 whether use of the reader/printer unit 40 is inhibited (failure or power-OFF). If YES in step S126-4, data representing that use of the reader/printer unit 40 is inhibited is set in the RAM in step S126-15. If the use of the reader/printer unit 40 is not inhibited, a "REMOTE" instruction (an instruction for remote-controlling the reader/printer unit 40 from the main body CPU 26) is generated and transmitted to the CPU 43 in the reader/printer unit 40 in step S126-5. If an ACK signal is not received from the CPU 43 in step S126-6, the flow advances to step S126-15. If the ACK signal is received from the CPU 43 in step S126-6, the flow advances to step S126-7. A "SENSE" instruction for causing the CPU 43 to check the state of the reader/printer unit 40 is generated and transmitted in step S126-7. It is determined in step S126-8 in accordance with the response signal from the CPU 43 whether the reader/printer unit 40 is usable. If NO in step S126-8, the flow advances to step S126-15. However, if YES in step S126-8, a "SENSE" instruction for causing the CPU 43 to check the memory capacity of the IMEM 42 is generated and transmitted in step S126-9. When an ACK signal is sent back from the CPU 43 in step S126-10, the flow advances to step S126-11. Otherwise, the flow advances to step S126-15. In step S126-11, all the memory capacity of the IMEM 42 is set to the designated area of the RAM. In steps S126-12 and S126-13, a "PPRREQ" instruction for detecting the paper size of the reader/printer unit 40 (the printer 70 has upper and lower cassettes) is generated and transmitted to the CPU 43. When an ACK signal is received from the CPU 43, the paper size is set to the designated area of the RAM. When the FAX-CHK routine is ended, pieces of information representing the reception-side apparatus state and its function are set in the response header (having the same format as in the image header of FIG. 8) in accordance with various pieces of information set in the RAM in the FAX-CHK routine in step S127 in FIG. 18. In step S128, the response header is generated and transmitted to the transmission side. If it is determined in step S129 that paper having a size larger than that designated on the transmission side is not present and the memory remaining capacity of the hard disk device 50 is less than 3 Mbyte (i.e., if the transmission-side communication request is not acceptable), the communication line is disconnected in step S130. A communication error message is displayed on the CRT 60 in step S131, and the flow returns to the start. However, if the transmission-side communication request is determined in step S129 to be acceptable, a reception menu shown in FIG. 30 is displayed on the CRT 60 in step S132. It is determined in step S133 whether memory reception is designated. If NO in step S133, the flow advances to steps S134 to S151 (FIGS. 21 and 22) to perform real-time reception and recording. However, if memory reception is designated, the flow advances to steps S152 to S158 (FIG. 23), thereby performing memory reception.

In step S134, the block storage areas 100 and 101 are assured in the RAM area in FIG. 8. In step S135, a "REMOTE" instruction is generated and transmitted to the CPU 43. In step S136, if an ACK signal is not received from the CPU 43, communication error data is set, and the flow advances to step S159 (FIG. 18). However, if the ACK signal is received from the CPU 43, an "INIT" instruction is generated and transmitted to the CPU 43 in step S138. If an ACK signal is not received from the CPU 43 in step S139, communication error data is set in step S140, and the flow advances to step S159. However, if the ACK signal is received from the CPU 43, an INITBIT instruction is generated and transmitted to the CPU 43 in step S141. If an ACK signal is not received from the CPU 43 in step S142, communication error data is set in step S143, and the flow advances to step S159. When the ACK signal is received from the CPU 43, a "CREATE" instruction (an instruction for assuring an area for storing one-page color image data in the IMEM 42) is generated and transmitted to the CPU 43 in step S144. If the ACK signal is not received from the CPU 43 in step S145, communication error data is set in step S146, and the flow advances to step S159. When the ACK signal is received from the CPU 43, reception of image data is started in step S147. In steps S148 and S149, the received color compressed data is stored in the compression data storage area 102 in FIG. 7, while the compressed data in the area 102 is transmitted to the ICU 22, and data expanded by the ICU 22 is stored in the area 101. When one-block expanded data (1 Mbyte) is stored in the area 101, the one-block expanded data in the area 101 is transferred to the area 100. Upon completion of transfer to the area 100, the one-block expanded data is transferred from the area 100 to the IMEM 42. At this time, reception of the next compressed data is performed functionally parallelly with storage of the expanded data in the area 101. When reception of all the block data is completed, the communication line is disconnected in step S150. The final block reception data is transferred to the IMEM 42 in step S151. The block data divisionally received in the IMEM 42 are synthesized, so that one-page color image data is obtained. The flow then advances to step S159.

On the other hand, when the flow advances from step S133 to step S152 (FIG. 23) in memory reception, the image header received in steps S152 to S154 is stored in the hard disk device 50 to form a reception file. Reception of the color image data is started in step S155. The received color compressed data is stored in the area 102 in FIG. 7, and the data is then transferred from the area 102 to the hard disk device 50 in steps S156 and 157. As described above, the compressed data are received block by block and are sequentially stored in the file formed in the hard disk device 50. When reception of all the block data is completed, the communication line is disconnected in step S158, and the flow advances to step S159.

Figure 19B:
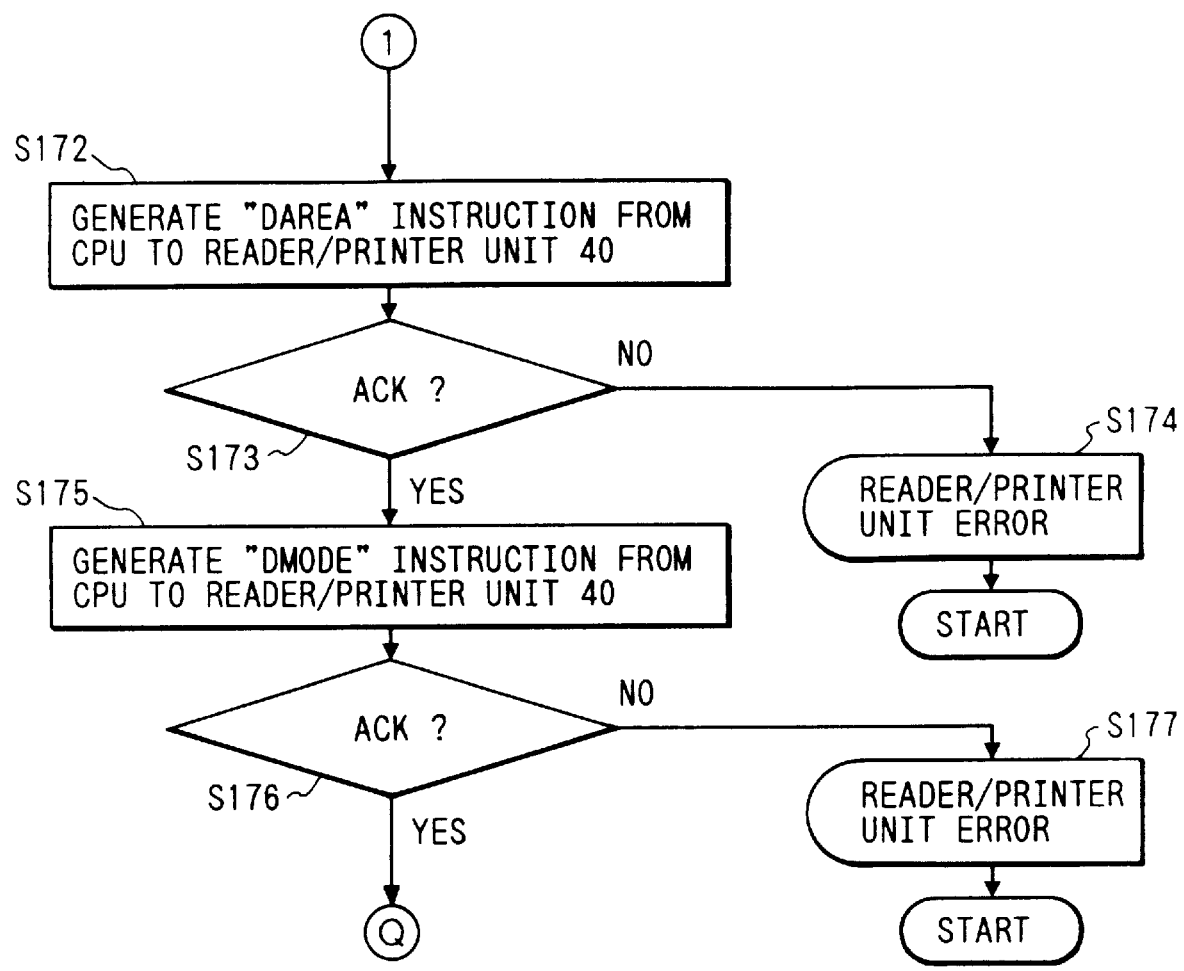
FIG. 19, consisting of FIGS. 19A and 19B, is a flow chart showing still another detailed control operation of this embodiment.
Figure 20:
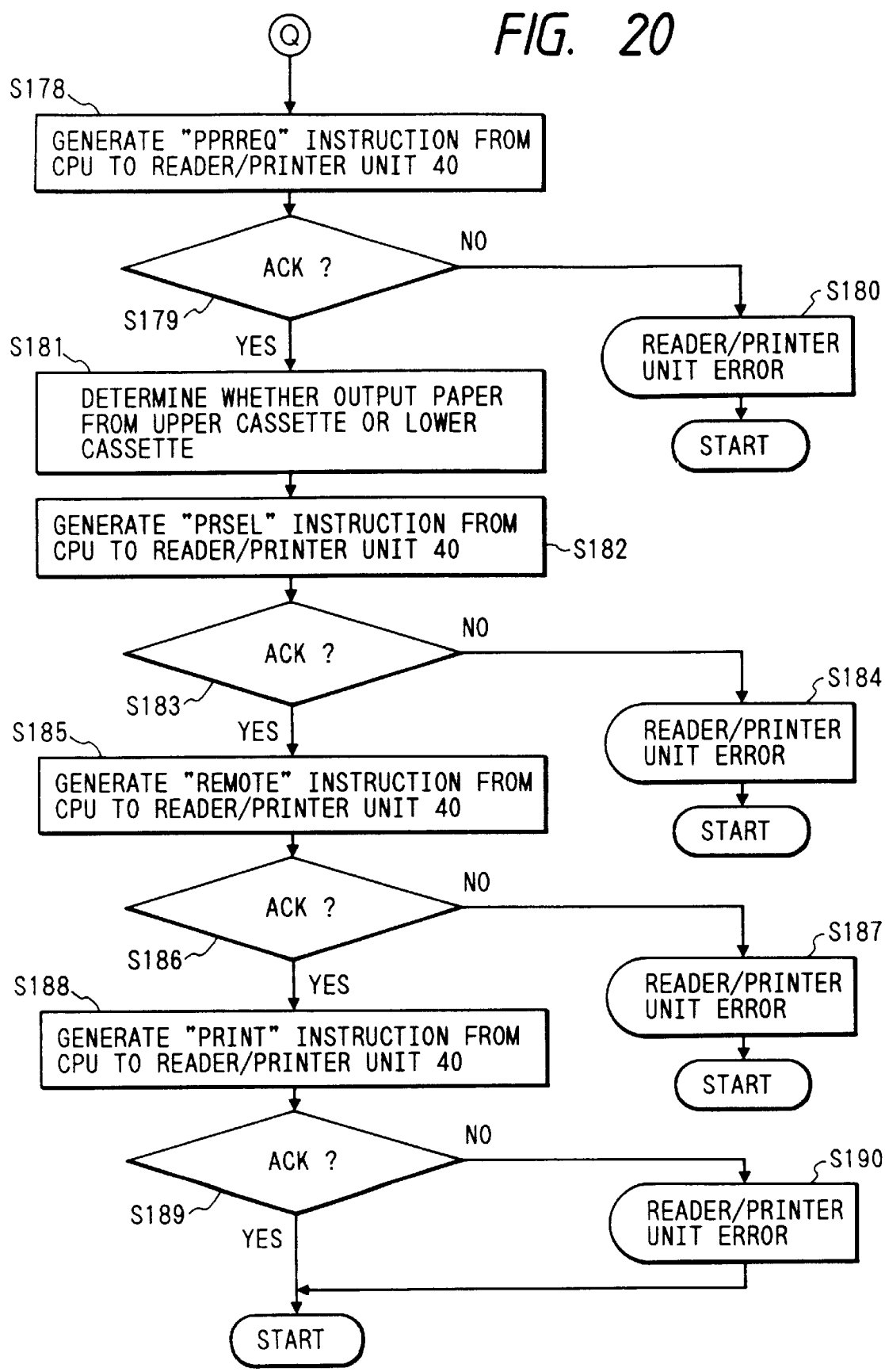
FIG. 20 is a flow chart showing still another detailed control operation of this embodiment.
Figure 21:
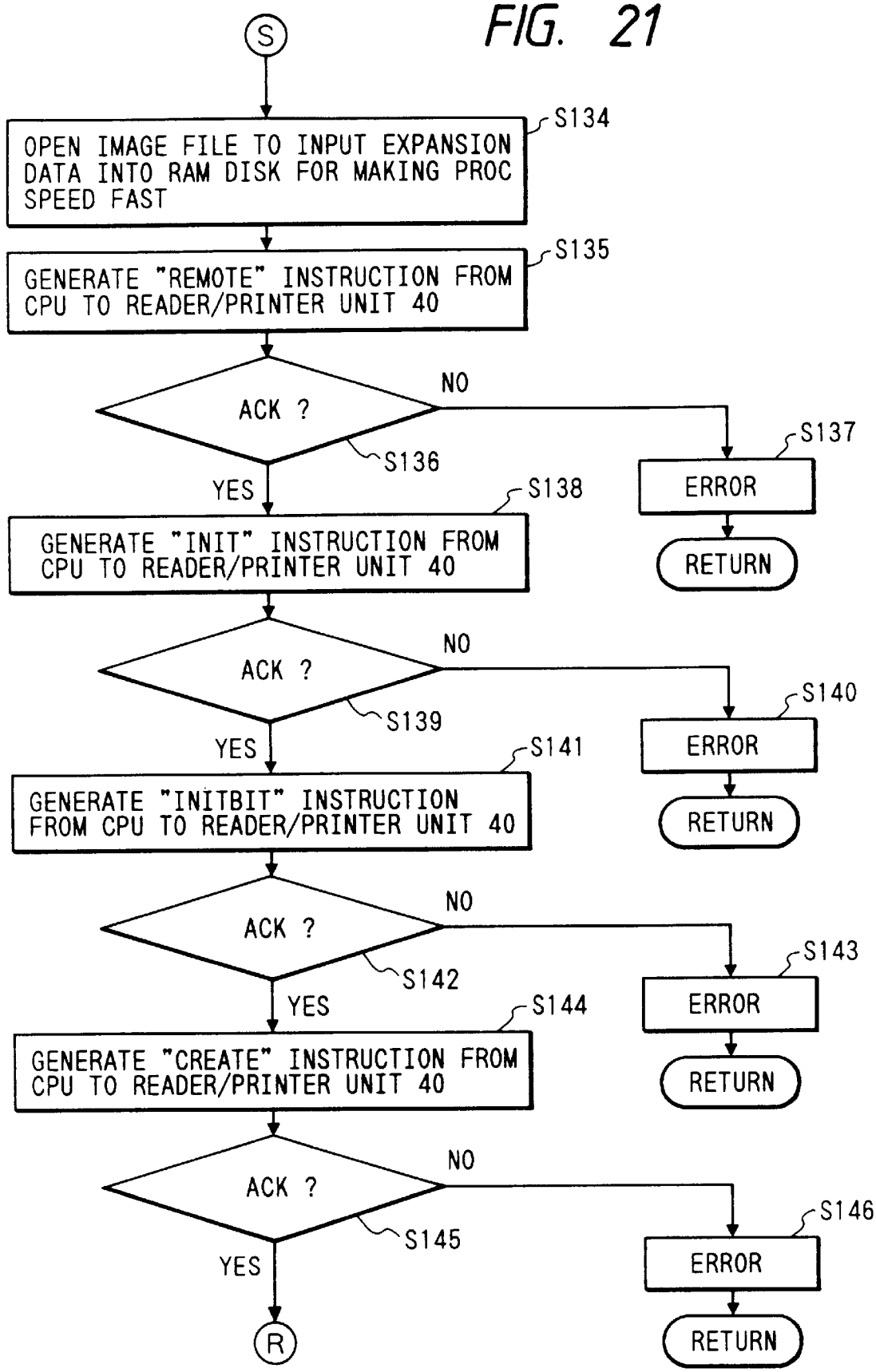
FIG. 21 is a flow chart showing still another detailed control operation of this embodiment.
Figure 22:
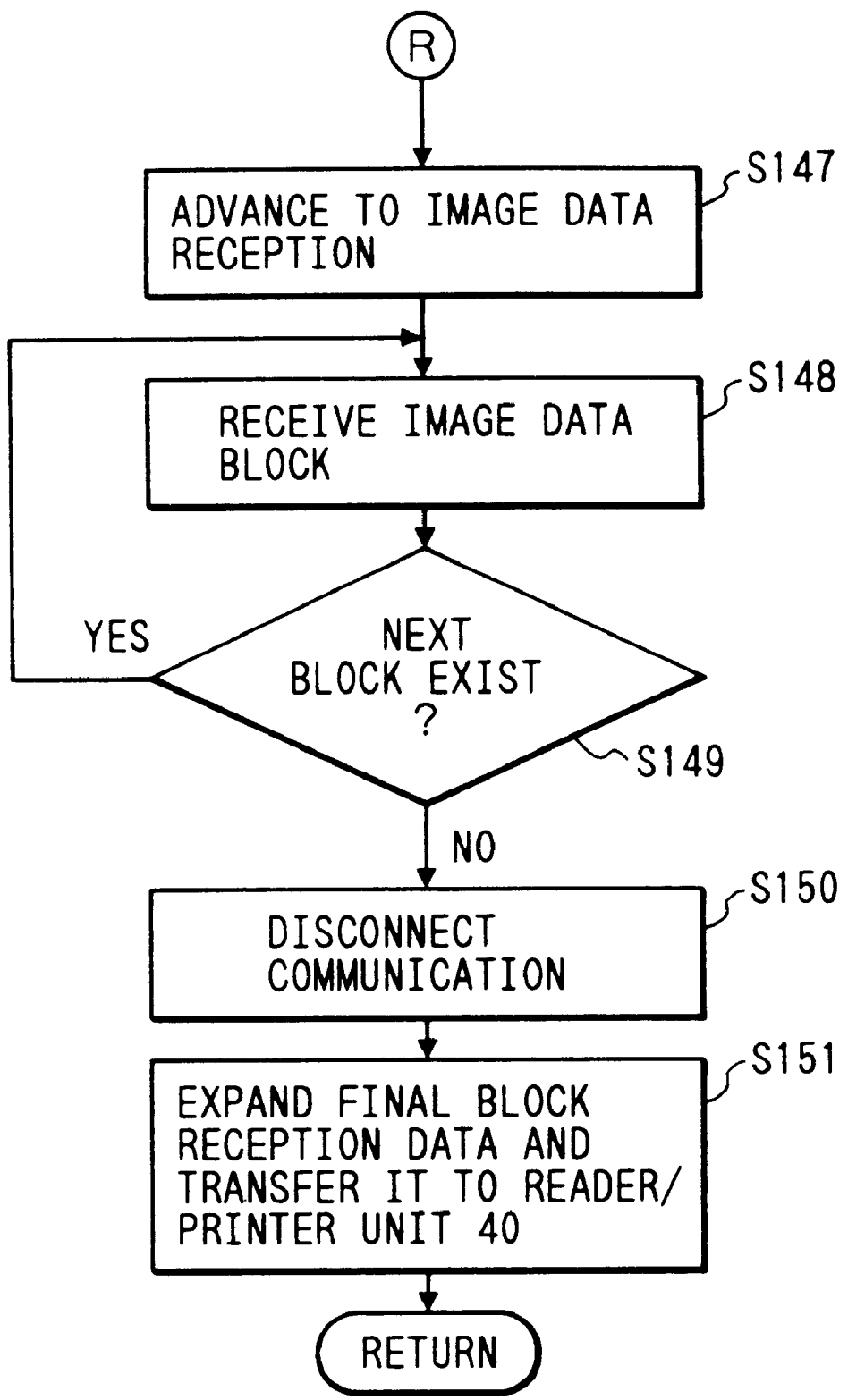
FIG. 22 is a flow chart showing still another detailed control operation of this embodiment.
Figure 23:
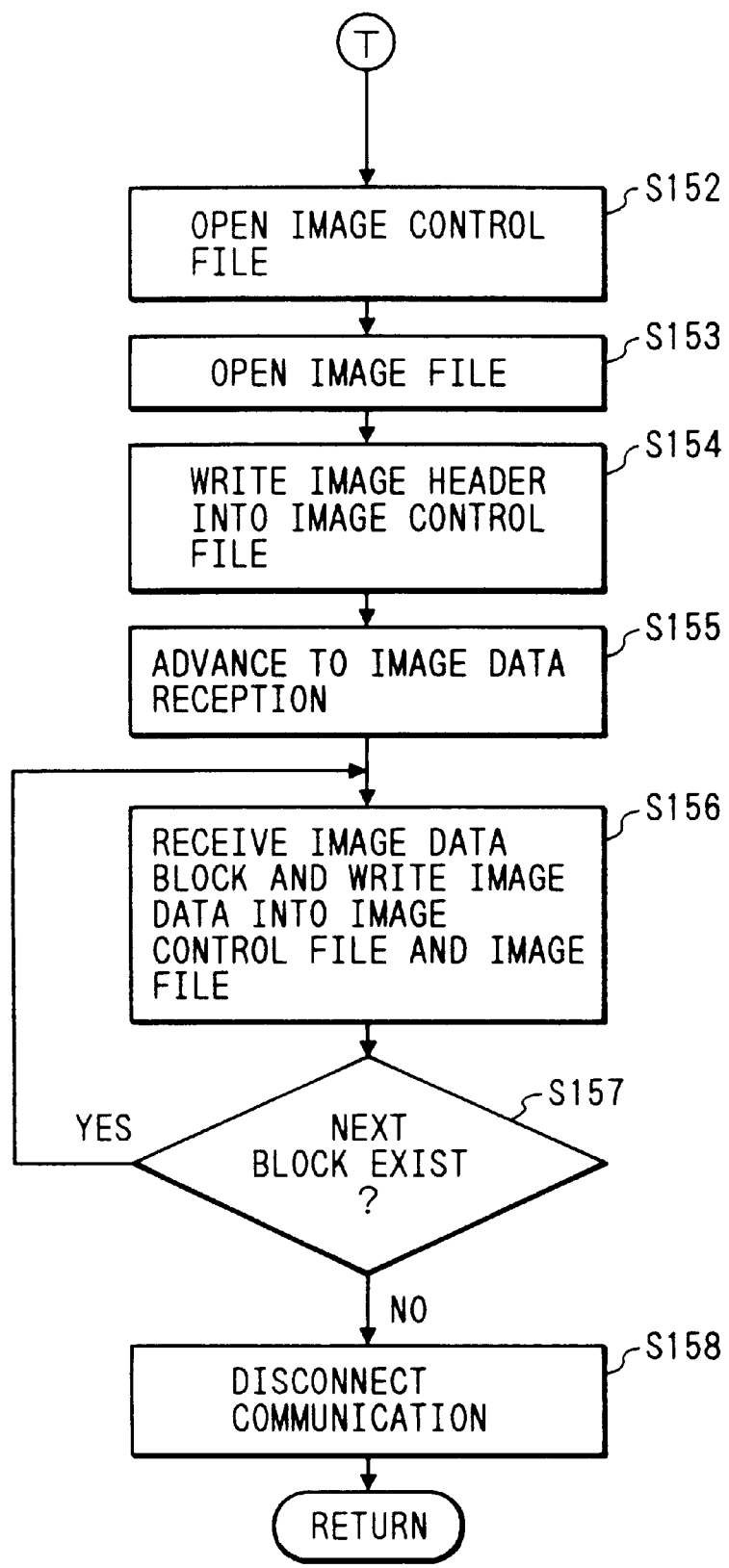
FIG. 23 is a flow chart showing still another detailed control operation of this embodiment.
Figure 24:
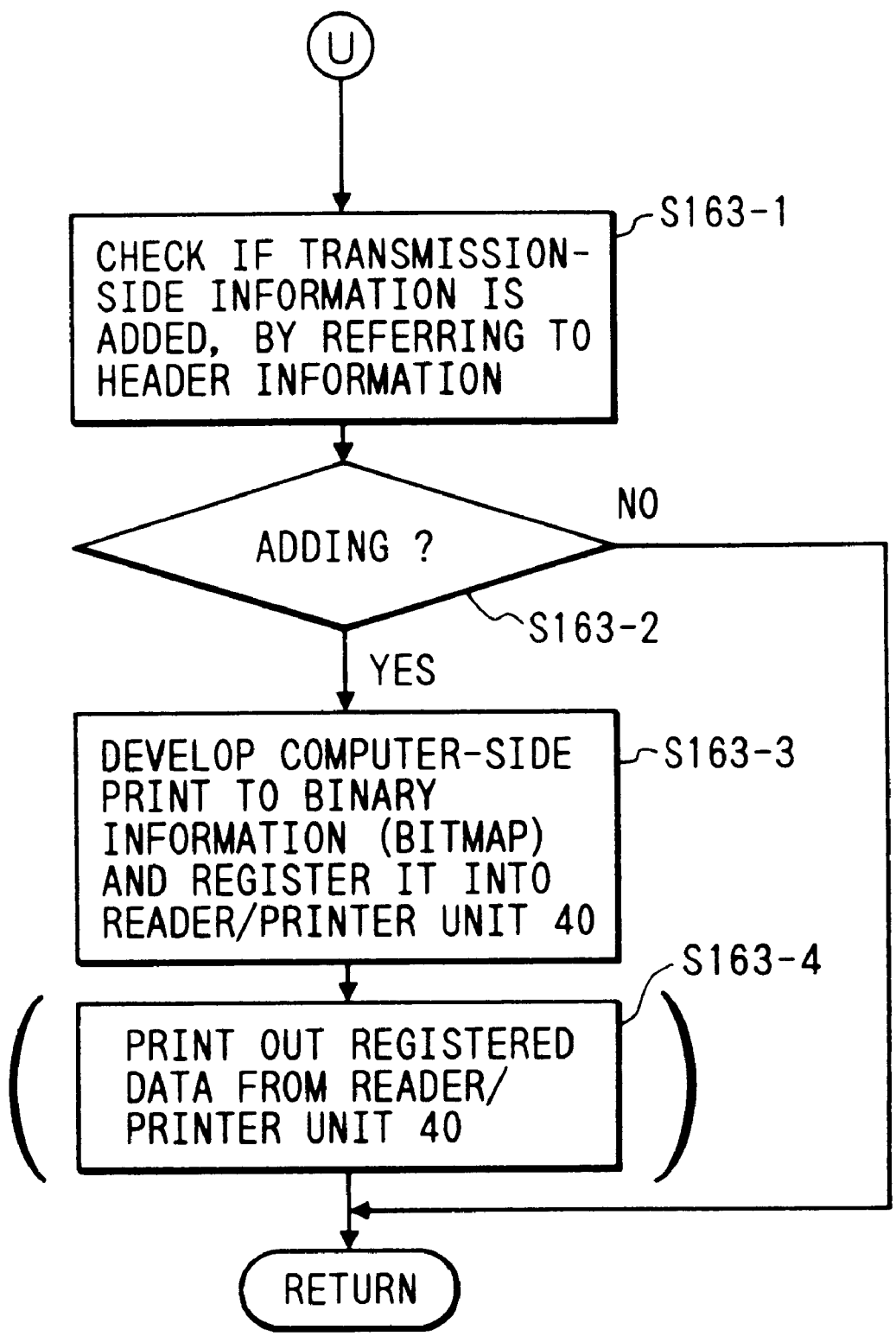
FIG. 24 is a flow chart showing still another detailed control operation of this embodiment.
Figure 25:
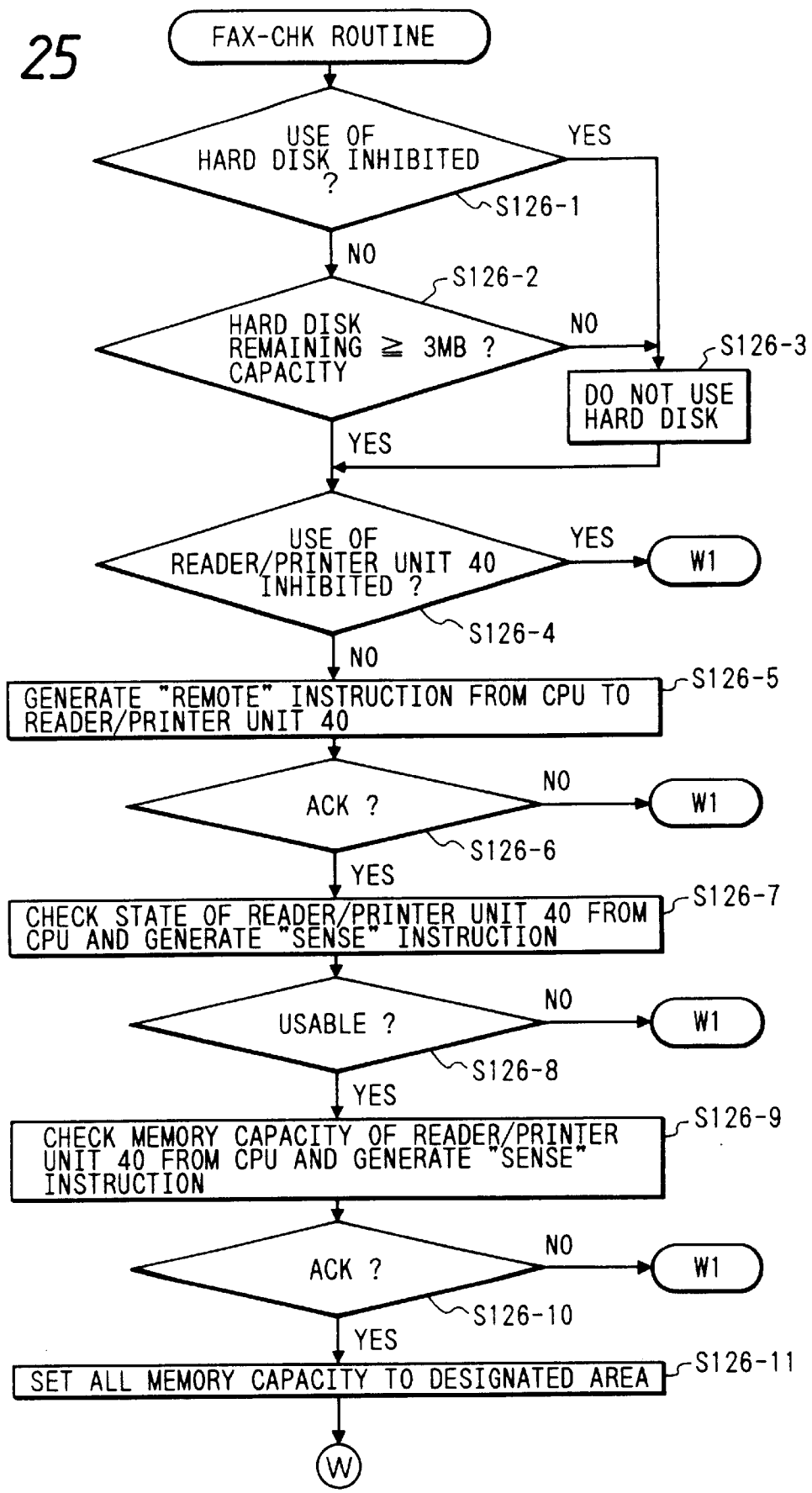
FIG. 25 is a flow chart showing still another detailed control operation of this embodiment.
Figure 26:
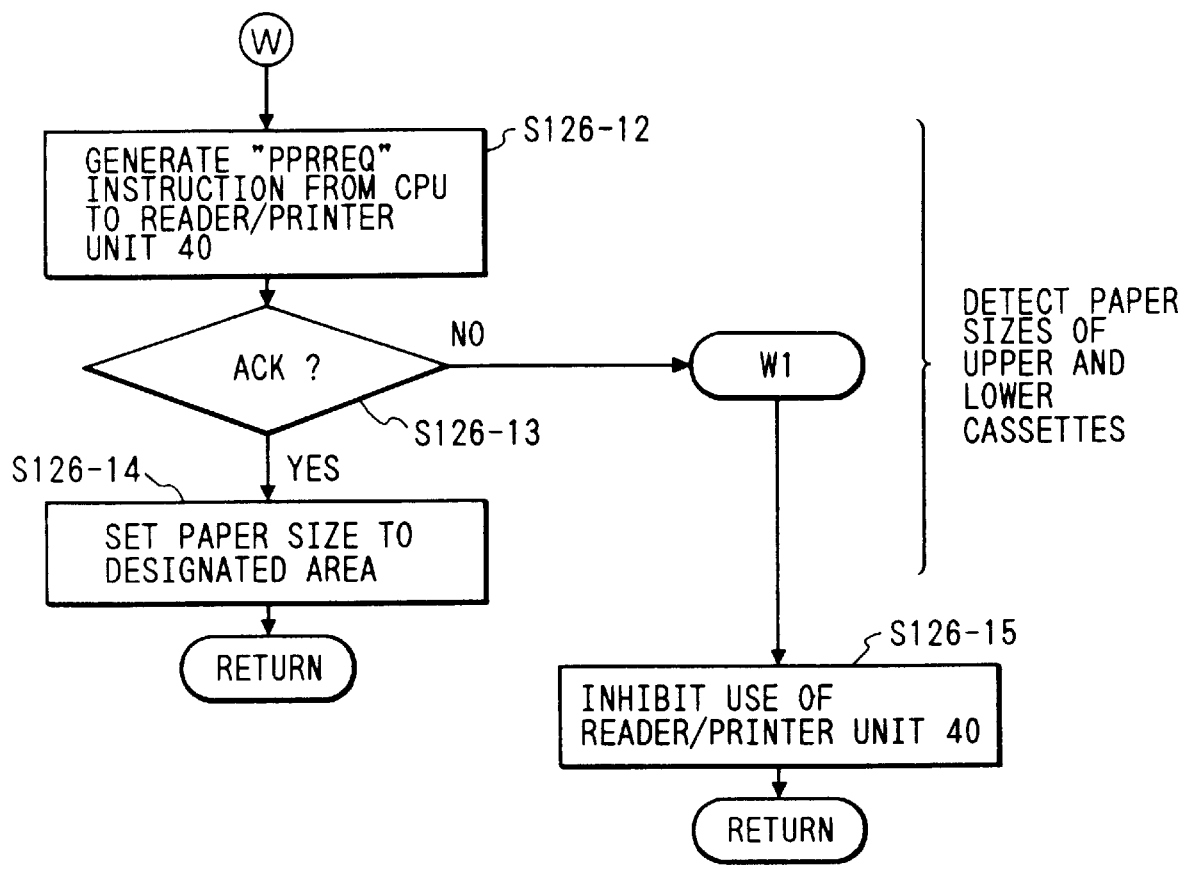
FIG. 26 is a flow chart showing still another detailed control operation of this embodiment.

It is determined in step S159 of FIG. 18 whether a communication error occurs. If YES in step S159, a message representing a communication error or an error of the reader/printer unit 40 is displayed on the CRT 60 in step S160, and the flow returns to the start. If no communication error is present, it is determined in step S161 whether memory reception is performed. If YES in step S161, the flow returns to the start. Otherwise, the flow advances to a print routine of steps S162 to S190 (FIGS. 19 and 20).

If printing of hard disk data is designated in step S16 of FIG. 9, and a file to be printed is designated, the data is read out from the hard disk device 50. The compressed data is expanded by the ICU 22, and the expanded data is stored in the IMEM 42. The flow advances to this print routine.

In step S162, a "REMOTE" instruction is generated and transmitted to the CPU 43. It is determined in step S163 whether an ACK signal is received from the CPU 43. When the flow advances to step S162 in real-time reception, the CPU 43 in the reader-printer unit 40 has already been set in a remote state. In steps S162 and S163, the printer 70 in the reader/printer unit 40 is set in a locked state. If an ACK signal is not received from the CPU 43, an error message of the reader/printer unit is displayed on the CRT 60 in step S164, and the flow returns to the start. When the ACK signal, however, is received from the CPU 43, the flow advances to step S163-1 in FIG. 24 to check if a space for adding transmission-side information (e.g., date, transmission-side telephone number, abbreviation, and a page number) is available on the paper on the basis of the received image header information. If the presence of the space for adding the transmission-side information is determined in step S163-2, the transmission-side information is developed in accordance with monochrome fonts and the developed data is transferred to the designated area of the IMEM 42 in the reader/printer unit 40 (i.e., the computer-side print is developed to binary information (bitmap) and the developed data is registered into the reader/printer unit 40) in step S163-3. Alternatively, the transmission-side information may be recorded as one separate cover page, and color image data may be recorded from the second page. In this case, it is determined in steps S163-1 and S163-2 whether page recording of the transmission-side information is designated. If YES in step S163-2, the transmission-side information is developed in accordance with monochrome fonts and the developed data is transferred to the IMEM 42 in step S163-3. The registered or stored data are recorded or printed out from the reader/printer unit 40 in step S163-4.

In step S165, a "DSEL" instruction for selecting data from the IMEM 42 as print data is generated and transmitted to the CPU 43. It is determined in step S166 whether an ACK signal is received from the CPU 43. If the ACK signal is not received from the CPU 43, a reader/printer unit error is displayed on the CRT 60 in step S167, and the flow returns to the start. However, when the ACK signal is received from the CPU 43, it is determined in step S168 whether color image data stored in the IMEM 42 is rotated. If YES in step S168, a "ROTATE" instruction (an instruction for rotating an image) set with data representing a rotational angle and the like is generated in step S169. It is determined in step S170 whether an ACK signal is received. If NO in step S170, a reader/printer unit error is displayed in step S171, and the flow returns to the start. If YES in step S170, a "DAREA" instruction for designating a print position of color image data in the IMEM 42 and a print resolution of the data is generated and transmitted to the CPU 43 in step S172. If an ACK signal is not received in step S173, a reader/printer unit error is displayed on the CRT 60 in step S174, and the flow returns to the start. When the ACK signal is received, a "DMODE" instruction for designating a print size of the color image data stored in the IMEM 42 is generated and transmitted to the CPU 43 in step S175. If an ACK signal is not received from the CPU 43 in step S176, a reader/printer unit error is displayed in step S177, and the flow returns to the start. However, if the ACK signal is received, the flow advances to step S178.

In step S178, a "PPRREQ" instruction for checking paper sizes of the upper and lower cassettes of the printer 70 is generated and transmitted to the CPU 43. If an ACK signal is not received from the CPU 43 in step S179, a reader/printer unit error is displayed in step S180, and the flow returns to the start. If an ACK signal is received from the CPU 43, one of the upper and lower cassettes is selected in step S181 in accordance with the paper sizes of the upper and lower cassettes set in the received ACK signal. A "PRSEL" instruction for designating the paper size is generated and transmitted to the CPU 43 in step S182. If an ACK signal is not received from the CPU 43 in step S183, a reader/printer unit error is displayed in step S184, and the flow returns to the start. If the ACK signal is received from the CPU 43, a "REMOTE" instruction for releasing a locked state of the printer 70 (the CPU 43 is kept in a remote control state) is generated and transmitted to the CPU 43 in step S185. If an ACK signal is not received from the CPU 43 in step S186, a reader/printer unit error is displayed in step S187, and the flow returns to the start. When the ACK signal is received, a "PRINT" instruction for recording color image data in the IMEM 42 at the printer 70 is generated and transmitted to the CPU 43 in step S188. It is determined in step S189 whether an ACK signal is received from the CPU 43. If the ACK signal is not received from the CPU 43, a reader/printer unit error is displayed on the CRT 60, and then the flow returns to the start.

Figure 27:
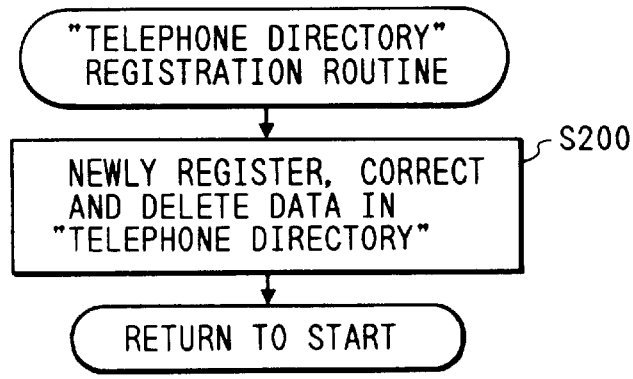
FIG. 27 is a flow chart showing still another detailed control operation of this embodiment.

If telephone directory registration is designated in step S13 of FIG. 9, the flow advances to the "telephone directory" registration routine in FIG. 27. In step S200, the telephone directory image plane shown in FIG. 29 is displayed on the CRT 60. Operations such as new registration, correction, and deletion are manually performed by the operator.

When a transmission partner is designated by the telephone directory, the area of the designated partner is reversed, as shown in FIGS. 29 and 33. When transmission of the color image data is started in step S75 in FIG. 14 or step S95 in FIG. 15, a dialogue saying "in transmission" shown in FIGS. 31 and 32 is displayed while overlapping the telephone direction image plane. The length of a bar is gradually changed in synchronism with transmission of the block data, thereby allowing the operator to check the transmission process. In the broadcasting mode, a partner name and a partner number are displayed simultaneously with a dialogue saying "in transmission", as shown in FIG. 32. When a partner number is input with a ten-key pad or the like, a dialogue saying "in transmission" is displayed under the partner telephone number, as shown in FIG. 31, so that the called partner can be checked without displaying the partner in the dialogue.

If the reader/printer unit 40 is not usable in steps S132 (FIG. 18) of the reception routine, the display shown in FIG. 37 is performed on the CRT 60. When "2. NO" is selected, communication is ended without performing memory reception. When no input operation is performed by the operator, memory reception is automatically performed.

In this embodiment, data to be transmitted is a color image, but is not limited to this.

In this embodiment, the image data is printed out, but may be displayed on a monitor.

Image data to be input may be input from an external memory device, a host computer, a still video camera, a video camera, or the like in addition to data read by the reader unit. In addition, image data to be output may be stored in an external memory device in addition to be print-out.

According to the embodiment described above, as has been described above, when data communication is to be performed using a technique for replacing data itself with a displacement of adjacent data without using any reference value in transfer of read image data, data can be decoded while image quality deterioration is suppressed on the reception side.

According to the present invention, as has been described above, deterioration of image quality upon division of an image into blocks and encoding the blocks can be prevented. In addition, an image is appropriately divided into blocks to efficiently encode image data.

According to the present invention, in data communication of color image data having a large quantity of data, one-page color image data is divided into a plurality of blocks, and input processing of the block data is performed functionally parallelly with compression/transmission processing, thereby executing high-speed color image data communication.

Color image data can be processed at high speed even in reception of color image data.

The present invention is not limited to the particular embodiment described above. Various changes and modifications may be made within the scope of the appended claims.

What is claimed is:

1. An image processing apparatus, comprising:

transmission means for transmitting image data to a communication partner by selectively using one of a first transmission mode and a second transmission mode; and display means for displaying first image information representing the communication partner and second image information representing a communication state, wherein, in the first transmission mode, said display means displays the first image information independently from the second image information such that the second image information does not overlap the first image information and such that the first image information is not included in the second image information, and in the second transmission mode, said display means displays the second image information such that the first image information is included in a part of the second image information.

2. An apparatus according to claim 1, wherein the first image information is a partner number of the communication partner.

3. An apparatus according to claim 1, wherein the first image information is a name of the communication partner.

4. An apparatus according to claim 1, wherein the second image information is real time information that changes over time during transmission.

5. An apparatus according to claim 1, wherein the second image information can overlap the first image information in the second transmission mode.

6. An apparatus according to claim 1, wherein in the first transmission mode, the communication partner is set by key inputting a partner number of the communication partner, and in the second transmission mode, the communication partner is set by selecting at least one of plural communication partners previously registered in said apparatus.

7. An apparatus according to claim 1, wherein said transmission means transmits the image data to a single communication partner in the first transmission mode, and transmits the image data to plural communication partners in the second transmission mode.

8. An image processing method comprising the steps of:

transmitting image data to a communication partner by selectively using one of a first transmission mode and a second transmission mode; and displaying, on a display unit, first image information representing the communication partner and second image information representing a communication state, wherein, in the first transmission mode, said display step displays the first image information independently from the second image information such that the second image information does not overlap the first image information and such that the first image information is not included in the second image information, and in the second transmission mode, said display step displays the second image information such that the first image information is included in a part of the second image information.

* * * * *